(12) United States Patent
Enami et al.

(10) Patent No.: US 11,055,146 B2
(45) Date of Patent: Jul. 6, 2021

(54) DISTRIBUTION PROCESS SYSTEM AND DISTRIBUTION PROCESS METHOD

(71) Applicant: FUJITSU LIMITED, Kawasaki (JP)

(72) Inventors: Takashi Enami, Kawasaki (JP); Masanori Yamazaki, Kawasaki (JP); Nami Nagata, Kawasaki (JP); Hitoshi Ueno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 205 days.

(21) Appl. No.: 16/293,880

(22) Filed: Mar. 6, 2019

(65) Prior Publication Data

US 2019/0303210 A1    Oct. 3, 2019

(30) Foreign Application Priority Data

Mar. 29, 2018 (JP) .............................. JP2018-063510

(51) Int. Cl.
*G06F 9/50* (2006.01)
*H04L 29/08* (2006.01)
(52) U.S. Cl.
CPC .......... *G06F 9/5072* (2013.01); *G06F 9/5088* (2013.01); *H04L 67/125* (2013.01)
(58) Field of Classification Search
None
See application file for complete search history.

(56) References Cited

U.S. PATENT DOCUMENTS

| 2010/0251253 | A1* | 9/2010 | Pike ..................... G06F 9/505 718/104 |
| 2012/0002549 | A1  | 1/2012 | Dempo |
| 2016/0140012 | A1* | 5/2016 | Hsu ..................... H04L 67/1029 702/186 |
| 2018/0006951 | A1* | 1/2018 | Guim Bernat .......... G06F 9/505 |

FOREIGN PATENT DOCUMENTS

| JP | 2005-4676   | 1/2005 |
| WO | 2010/107105 | 9/2010 |

* cited by examiner

*Primary Examiner* — Wynuel S Aquino
(74) *Attorney, Agent, or Firm* — Fujitsu Patent Center

(57) ABSTRACT

A distribution process system includes a first terminal configured to, in accordance with a change relating to a processing load, perform transmission of first information relating to the processing load of the first terminal to a second terminal having a transmission frequency of a message relating to a processing load of the second terminal to a management device higher than a transmission frequency of a message relating to the processing load of the first terminal, the second terminal configured to, in response to receiving the first information, transmit to the management device a first message relating to the processing load of the second terminal and the first information, and the management device configured to manage a load state of each of the first terminal and the second terminal, and update the load state of the first terminal in accordance with the first information in response to receiving the first information.

16 Claims, 18 Drawing Sheets

FIG. 5

| | PROGRAM ID | LOAD ($W_{proc}$) |
|---|---|---|
| 500-1 | PG1 | 98 |
| 500-2 | PG2 | 120 |
| | ⋮ | ⋮ |

LOAD MANAGEMENT TABLE — 120

FIG. 6

| PROCESS ID | LOAD ($W_{proc\_k}$) | UPDATE TIME |
|---|---|---|
| p1 | 120 | 2017-06-26 11:24:00 |
| ... | ... | ... |
| : | : | : |

FIRST PROCESS INFORMATION MANAGEMENT TABLE ~130

| EDGE ID | PROCESS ACTIVATION TIME | EXPECTED PROCESS END TIME |
|---------|-------------------------|---------------------------|
| E1 | 2017-06-26 11:35:10 | 2017-06-26 11:36:13 |
| ... | ... | |
| : | : | : |

SECOND PROCESS INFORMATION MANAGEMENT TABLE ~140

700-1, 700-2

DISTRIBUTION PROCESS SYSTEM AND DISTRIBUTION PROCESS METHOD

CROSS-REFERENCE TO RELATED APPLICATION

This application is based upon and claims the benefit of priority of the prior Japanese Patent Application No. 2018-63510, filed on Mar. 29, 2018, the entire contents of which are incorporated herein by reference.

FIELD

The embodiments discussed herein are related to a distribution process technique.

BACKGROUND

With the progress of internet of things (IoT), the amount of data generated by end devices has increased, and it has become increasingly difficult to process all data and control devices in the cloud. For this reason, attention has been focused on distribution process environments by edge computing. Edge computing is a technique in which a plurality of edge devices are arranged on a computer network near a user, and load balancing and reduced communication delay are achieved.

A related art includes a technique in which in a case where the broker node accommodating the sensor node is in a high load state, the housing relation of the sensor node from the high load broker node to the low load broker node is switched by searching for another broker node using the registered filter condition. Another technique as the related art is disclosed in which each node on the network collects the processing load of the node itself, detects that it has exceeded the upper limit value, receives the processing load information of another node, refers to the upper limit value and the current value of the processing load of the node itself, and responds whether to accept processing.

Examples of the related art include International Publication Pamphlet No. WO 2010/107105, and Japanese Laid-open Patent Publication No. 2005-4676.

SUMMARY

According to an aspect of the embodiments, a distribution process system includes a first terminal configured to, in accordance with a change relating to a processing load, perform transmission of first information relating to the processing load of the first terminal to a second terminal having a transmission frequency of a message relating to a processing load of the second terminal to a management device higher than a transmission frequency of a message relating to the processing load of the first terminal, the second terminal configured to, in response to receiving the first information, transmit to the management device a first message relating to the processing load of the second terminal and the first information, and the management device configured to manage a load state of each of the first terminal and the second terminal, and update the load state of the first terminal in accordance with the first information in response to receiving the first information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram illustrating an example of storage contents of a load management table;
FIG. 6 is an explanatory diagram illustrating an example of storage contents of a first process information management table;
FIG. 7 is an explanatory diagram illustrating an example of storage contents of a second process information management table.

DESCRIPTION OF EMBODIMENTS

However, in the related art, when performing load balancing and so forth of a plurality of edge devices, there is a problem that the number of messages notified from the edge devices increases and the communication amount increases, because the state of the edge devices is grasped by the cloud. For example, it is conceivable to reduce the number of times (frequency) of notifying the cloud of the message from the edge device. However, a large error may occur between the state of the actual edge device and the state of the edge device recognized by the cloud.

Hereinafter, with reference to the drawings, embodiments of an error correction method, a distribution process system and an information processing device will be described in detail.

EMBODIMENTS

First, the system configuration of a distribution process system 100 according to the embodiment will be described.

Figure 1:
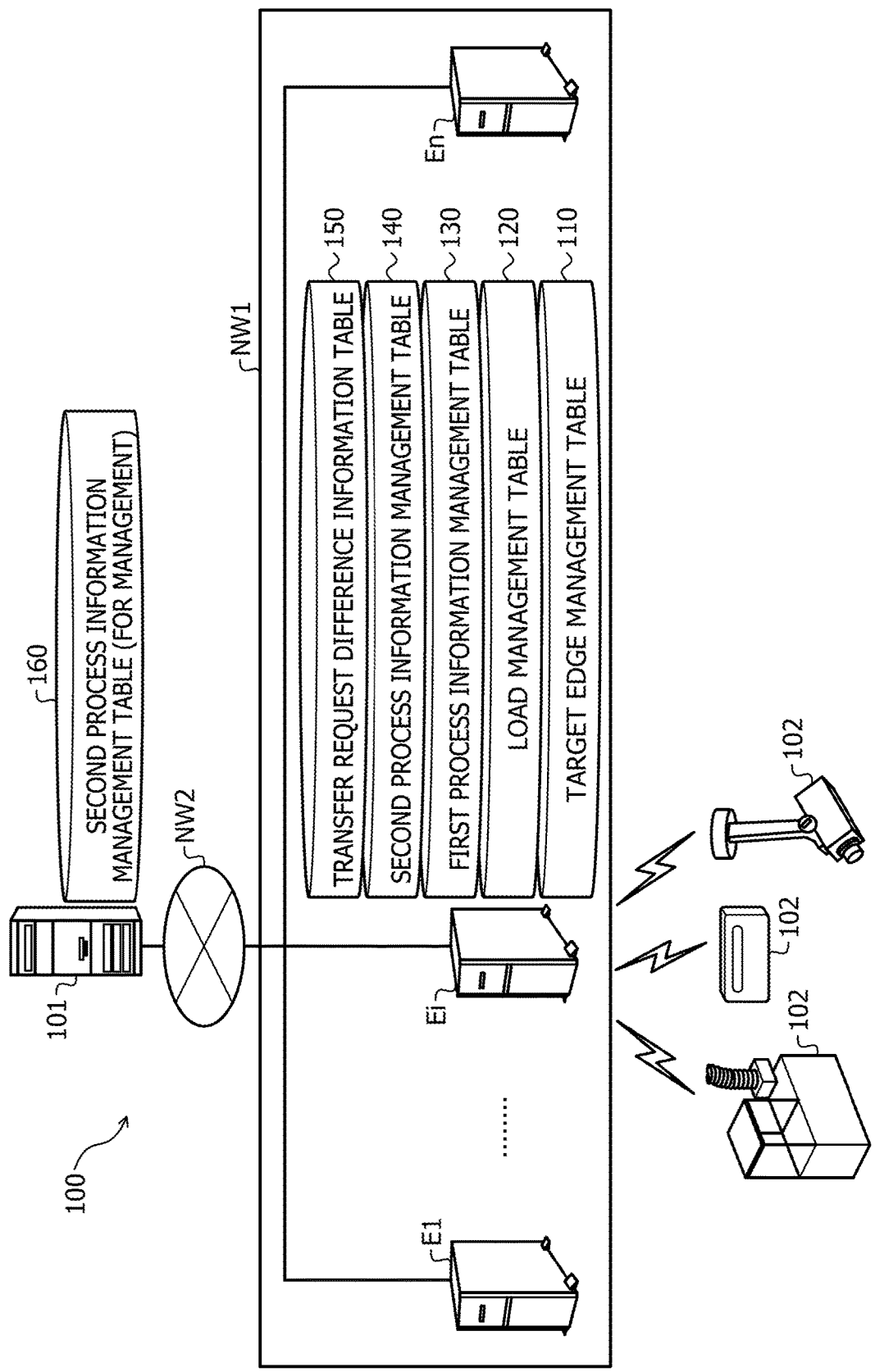
FIG. 1 is an explanatory diagram illustrating a system configuration example of a distribution process system.

FIG. 1 is an explanatory diagram illustrating a system configuration example of the distribution process system 100. In FIG. 1, the distribution process system 100 includes edge devices E1 to En (n: a natural number of 2 or more), and a management device 101. In the distribution process system 100, the edge devices E1 to En are connected so as to communicate with each other via a network NW1. The network NW1 is, for example, a local area network (LAN). The edge devices E1 to En and the management device 101 are connected to so as to communicate with each other via a network NW2. The network NW2 is, for example, a wide area network (WAN), or the Internet.

In the following description, an edge device among the edge devices E1 to En may be referred to as "an edge device Ei" (i=1, 2, . . . , N). Another edge device different from the edge device Ei among the edge devices E1 to En may be referred to as "another edge device Ej" (j≠i, j=1, 2, . . . , N).

The edge device Ei is an information processing device which receives the data transmitted from a device 102, and activates a process corresponding to the contents of the received data. The edge device Ei is, for example, a server, a gateway device, an access point, a personal computer (PC), or the like.

The device 102 includes, for example, devices such as production equipment, assembly equipment, an environment sensor, a camera, and so forth which are installed in a factory or the like. The device 102 may be a PC, a smartphone, or the like. The data transmitted from the device 102 is, for example, an error log of the production equipment or the assembly equipment, sensing data of the environment sensor, an image taken by the camera, or the like.

The edge device Ei, receives data transmitted from the device 102 by short-range wireless communication or wired communication. Examples of the short-range wireless communication include communication using a wireless LAN, Bluetooth (registered trademark), and so forth. The edge device Ei is located closer to the device 102 than the management device 101.

Examples of a process corresponding to the contents of data transmitted from the device 102 include a process of analyzing an image captured by the camera, and a process of performing a simple calculation on the sensing data of the environment sensor. The process of analyzing the image is heavier in load than the process of performing the simple calculation on sensing data.

The edge device Ei includes a target edge management table 110, a load management table 120, a first process information management table 130, a second process information management table 140, and a transfer request difference information table 150. The storage contents of the various tables 110, 120, 130, 140, and 150 will be described later with reference to FIGS. 4 to 8.

The management device 101 is a computer that manages the state of the edge devices E1 to En. For example, the management device 101 is a server of cloud computing. The management device 101 has a second process information management table (for management) 160. The storage contents of the second process information management table (for management) 160 will be described later with reference to FIG. 13. The data structure of the second process information management table (for management) 160 is the same as that of the second process information management table 140 of the edge device Ei.

In constructing a system in which a plurality of edge devices (for example, edge devices E1 to En) and a cloud (for example, the management device 101) cooperatively operate, it is important to perform load balancing and the like to manage the state of each edge device by the cloud. The state of the edge device managed by the cloud includes, for example, the number of processes under execution, and the remaining processing time of the process being performed.

It is conceivable to manage the state of the edge device by the cloud by notifying the cloud of the corresponding message when the process starts, or the process ends at the edge device. However, as the number of edge devices and processes in the system increases, the number of messages transmitted and received between the edge device and the cloud may increase. Since communication between the edge device and the cloud requires more communication load than communication between edge devices, it is desirable not to increase the number of messages transmitted and received between the edge device and the cloud when possible.

For this reason, it is conceivable to reduce the number of messages by not notifying the cloud of the message when the process ends at the edge device. For example, when the edge device activates the process, the edge device notifies the cloud of the message including the activation time and the load of the process, while when the process ends the edge device does not notify the cloud of the message. The load of a process is the amount of work actually performed in the process, and represents the amount of load that is required from the activation of the process to the end of the process.

In this case, it is possible to predict, by the cloud, the end time of the process using the activation time and the load of the process included in the message, the processing capacity of the edge device, and so forth. However, whenever the process is activated by the edge device, the message is notified to the cloud, so that the number of messages transmitted and received between the edge device and the cloud may still increase.

For this reason, it is conceivable that when a process with a small load is activated, notification to the cloud is omitted, and when a process with a large load is activated, the cloud is notified of the message together with difference information on the load state of the edge device. According to this, it is possible to reduce the message for the notification concerning the process with a small load, and it is possible to correct an error caused by not making a notification to the cloud.

However, there is a case where a process with a large load does not occur and only processes with a small load are generated in the edge device. For example, in order to analyze the movements of the workers in the factory, the process of analyzing the image captured by the camera occurs only when there is a person in the vicinity of the camera.

Therefore, if there is no person in the vicinity of the camera, no process of analyzing the image captured by the camera will occur. On the other hand, the process of performing an operation on the sensing data of the environment sensor may occur periodically or frequently. In such a case, although it is possible to reduce messages for the notification concerning the process with a small load, it is not possible to correct the error caused by not making a notification to the cloud.

Figure 2:
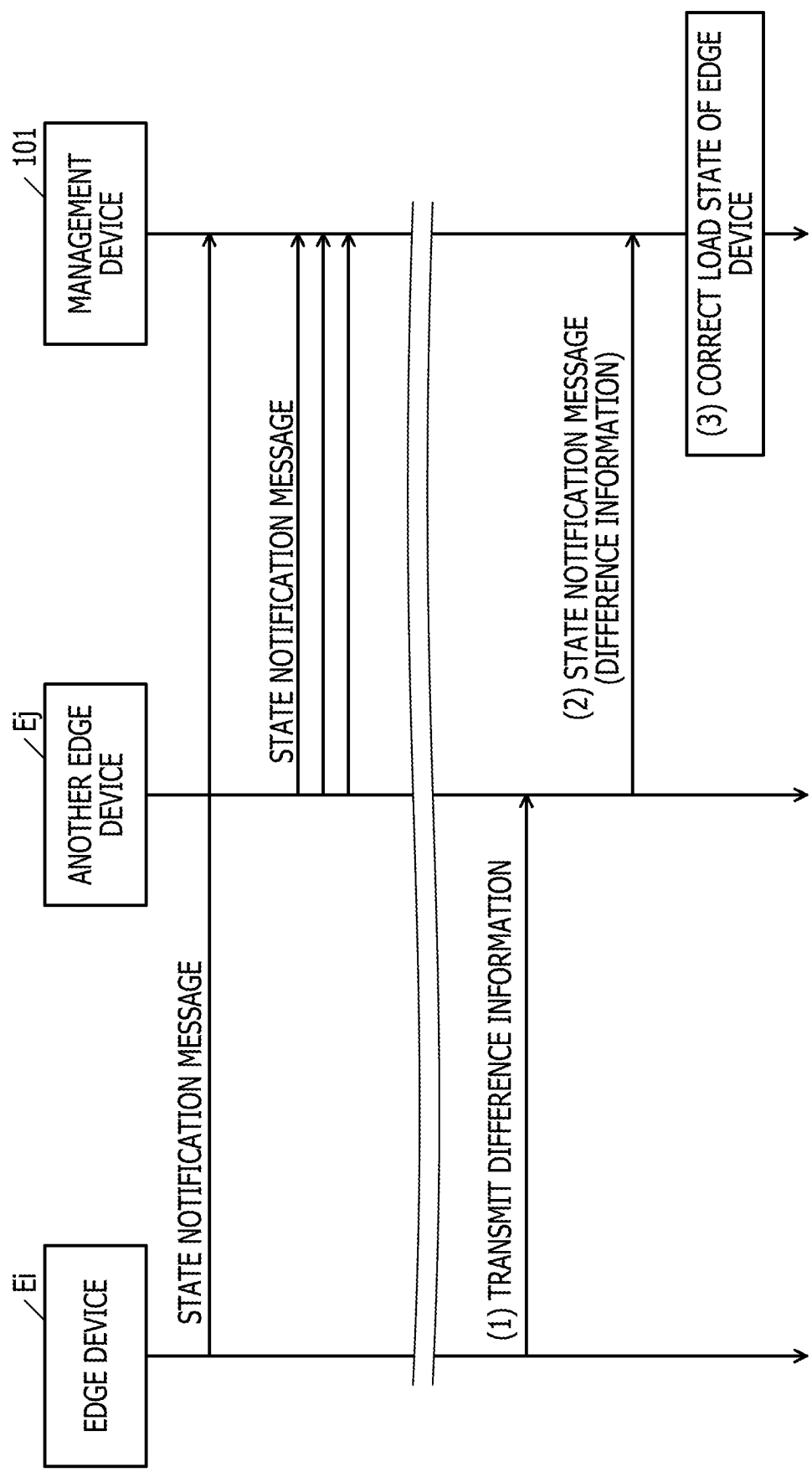
FIG. 2 is an explanatory diagram illustrating a processing example of the distribution process system.

Therefore, in the present embodiment, an error correction method for appropriately suppressing errors while suppressing the number of messages exchanged between the edge device Ei and the management device 101 (cloud) will be described. With reference to FIG. 2, a processing example of the distribution process system 100 will be described.

FIG. 2 is an explanatory diagram illustrating a processing example of the distribution process system 100. In FIG. 2, in a case where a process with a large load is activated each edge device Ei, Ej, transmits a state notification message to the management device 101 via the network NW2. The state notification message is a message for notifying the management device 101 of the status of each edge device Ei, Ej, and relates to the notification of the activation of the process having a large load.

A process with a large load is a process whose load is a value equal to or greater than a preset threshold value (corresponding to "threshold value α" described later). For example, the process of analyzing the image captured by the camera (device 102) is a process with a large load. In this case, it is assumed that the transmission frequency of the state notification message by the edge device Ei to the management device 101 is higher than that by another edge device Ej.

(1) The edge device Ei transmits difference information on the load state of the device itself to another edge device Ej having a higher transmission frequency of the state notification message to the management device 101 than the device itself. The difference information is information representing a difference between the amount of load of the device itself recognized by the edge device Ei and the amount of load of the edge device Ei recognized by the management device 101. In other words, the difference information represents an error caused by not notifying the management device 101 of a message concerning a process with a small load.

For example, the edge device Ei transmits, to another edge device Ej, a transfer request of the difference information on the load state of the device itself to the management device 101. Information identifying another edge device Ej having a high transmission frequency of the state notification message is obtained from the management device 101, for example.

(2) In a case where another edge device Ej receives the difference information from the edge device Ei, another edge device Ej transmits the state notification message in which the difference information is included when transmitting the state notification message to the management device 101. For example, in response to activation of a process having a large load in the device itself, another edge device Ej transmits, to the management device 101, a state notification message making a notification of the activation of the process in which the received difference information included.

(3) In a case where the management device 101 receives from another edge device Ej the state notification message including difference information, the management device 101 corrects the load state of the edge device Ei based on the difference information. For example, the management device 101, based on the difference information, corrects the load state of the edge device Ei so as to take away the difference between the amount of load of the device itself recognized by the edge device Ei, the amount of load of the edge device Ei recognized by the management device 101.

In this way, according to the distribution process system 100, the difference information on the load state of the edge device Ei is transferred to the management device 101 from another edge device Ej having a higher transmission frequency of the state notification message to the management device 101 than the edge device Ei. In this way, it is possible to correct the error relating to the load state of the edge device Ei predicted by the management device 101 even if the process serving as the trigger for notifying the management device 101 of the activation is not activated by the edge device Ei.

In the example of FIG. 1, although only one local area communication network is displayed as the network NW1, the distribution process system 100 may include a plurality of local area communication networks.

Hardware Configuration Example of Edge Device Ei

Figure 3:
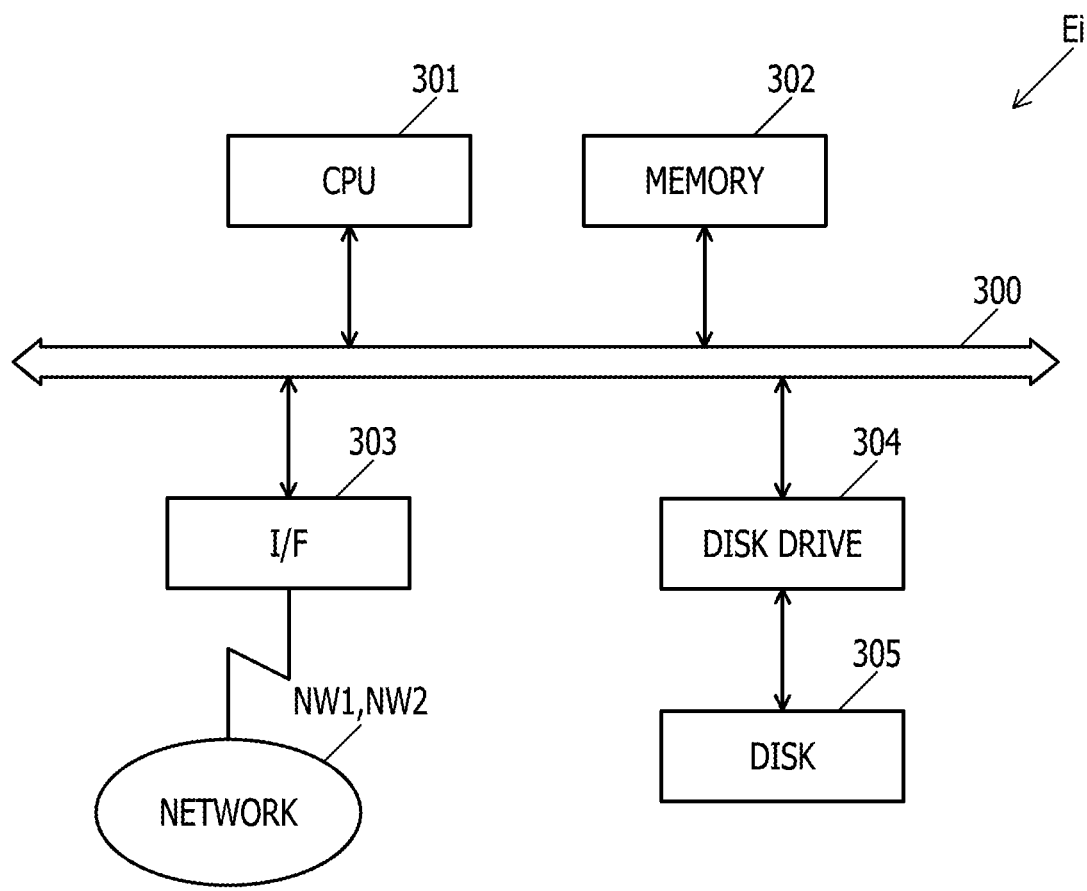
FIG. 3 is a block diagram illustrating a hardware configuration example of an edge device.

FIG. 3 is a block diagram illustrating a hardware configuration example of the edge device Ei. Referring to FIG. 3, the edge device Ei includes a central processing unit (CPU) 301, a memory 302, an interface (I/F) 303, a disk drive 304, and a disk 305. Each component is connected by a bus 300.

The CPU 301 controls the entire edge device Ei. The CPU 301 may have a plurality of cores. The memory 302 includes, for example, a read only memory (ROM), a random access memory (RAM), a flash ROM, and the like. For example, the flash ROM or the ROM stores various programs, and the RAM is used as a work area of ??the CPU 301. The program stored in the memory 302 is loaded into the CPU 301, thereby causing the CPU 301 to execute the coded processing.

The I/F 303 is connected to the networks NW1 and NW2 through a communication line, and is connected to another device (for example, the management device 101, another edge device Ej) via the networks NW1 and NW2. The I/F 303 controls the interfaces between the networks NW1 and NW2 and the inside of the device, and controls input and output of data from an external computer. The I/F 303 may include, for example, a modem, a LAN adapter, or the like.

The disk drive 304 controls reading/writing of data from/ to the disk 305 under the control of the CPU 301. The disk 305 stores data written under the control of the disk drive 304. The disk 305 includes, for example, a magnetic disk, an optical disk, or the like.

The edge device Ei may include, for example, a solid state drive (SSD), an input device, a display, and the like in addition to the above-described components. In a case where the edge device Ei performs short-range wireless communication with the device 102 illustrated in FIG. 1, the edge device Ei has a short-range wireless I/F. The management device 101 may also be implemented by the hardware configuration same as that of the edge device Ei.

Contents Stored in Various Tables 110, 120, 130, 140, and 150

Next, with reference to FIGS. 4 to 8, the contents stored in the various tables 110, 120, 130, 140, and 150 of the edge device Ei will be described. The various tables 110, 120, 130, 140, and 150 are constructed in storage devices such as the memory 302 and the disk 305 illustrated in FIG. 3.

In this case, the "edge device E1" will be described as an example of the edge device Ei.

Figure 4:
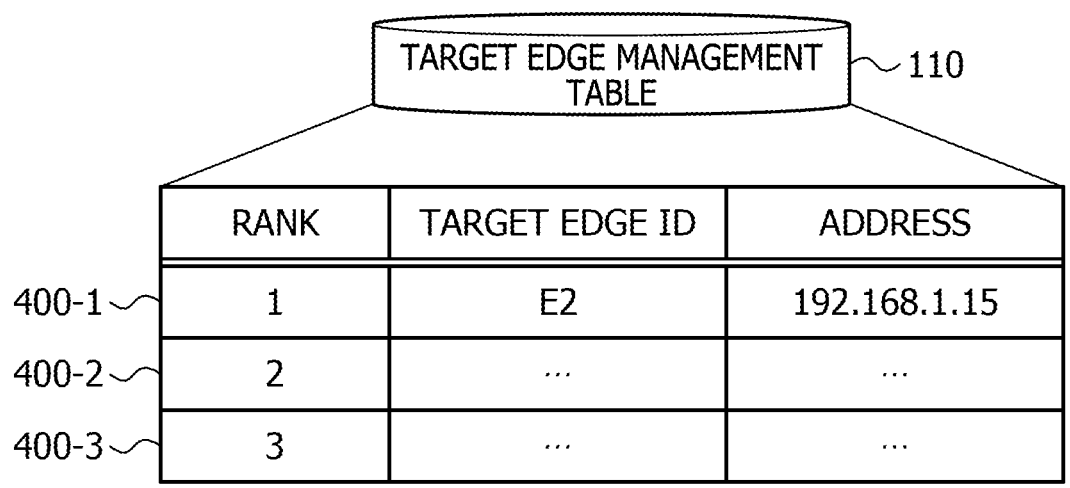
FIG. 4 is an explanatory diagram illustrating an example of storage contents of a target edge management table.

FIG. 4 is an explanatory diagram illustrating an example of storage contents of the target edge management table 110. In FIG. 4, the target edge management table 110 has fields of a rank, a target edge ID and an address, and stores the target edge information 400-1 to 400-3 as a record by setting information in each field.

The rank is a rank indicating the degree of transmission frequency of the state notification message to the management device 101. In this case, the rank up to the third is illustrated. The target edge ID is an identifier uniquely identifying the target edge. The target edge is an edge device as the requesting source that requests the transfer of the difference information on the load state of the edge device Ei to the management device 101. The address is the address of the target edge. For example, an internet protocol (IP) address is set as the address.

For example, the target edge information 400-1 indicates the first rank and the address "192.168.1.15" of the target edge E2. The edge ID of the device itself (the edge device E1 in the example of FIG. 4) may be set to the target edge ID.

FIG. 5 is an explanatory diagram illustrating an example of storage contents of the load management table 120. In FIG. 5, the load management table 120 has fields of a program ID and a load ($W_{proc}$), and stores load information (for example, load information 500-1, 500-2) as a record by setting information in each field.

The program ID is an identifier uniquely identifying the program executed by the edge device Ei. Examples of the program include a program for analyzing an image captured by a camera, a program for performing calculation on the sensing data of the environment sensor, and the like. The load ($W_{proc}$) is the average load of processes activated during program execution.

The process is a program execution unit. The load average of processes is represented by, for example, an average of the movement of the load of processes activated during the execution of the program identified by the program ID. A unit of load may be expressed by second, for example. For example, the load information 500-1 indicates the load ($W_{proc}$) "98" of the program PG1.

FIG. 6 is an explanatory diagram illustrating an example of storage contents of the first process information management table 130. In FIG. 6, the first process information management table 130 has fields of a process ID, a load ($W_{proc\_k}$) and an update time, and stores the first process information (for example, the first process information 600-1) as a record by setting information in each field.

The process ID is an identifier uniquely identifying a process being performed by the edge device Ei. The load ($W_{proc\_k}$) indicates the amount of load processed at the edge device Ei from the activation of the process to the update time. The update time indicates the date and time (year, month, day, hour, minute, second) at which the load ($W_{proc\_k}$) was updated.

For example, the first process information 600-1 indicates the load ($W_{proc}$) "120", and the update time "2017-06-26 11:24:00" of the process p1 activated by the edge device E1.

FIG. 7 is an explanatory diagram illustrating an example of storage contents of a second process information management table 140. In FIG. 7, the second process information management table 140 has fields of an edge ID, a process activation time, and an expected process end time, and stores second process information (for example, second process information 700-1, 700-2) as a record by setting information in each field.

The edge ID is an identifier uniquely identifying the edge device Ei. The process activation time indicates the date and time (year, month, day, hour, minute, second) at which the process was activated by the edge device Ei. The expected process end time indicates the expected date and time (year, month, day, hour, minute, second) at which the process ends at the edge device Ei.

For example, the second process information 700-1 indicates the process activation time "2017-06-26 11:35:10" and the expected process end time "2017-06-26 11:36:13" of the process activated by the edge device E1.

Although illustration is omitted, the second process information may include, for example, the load ($W_{proc}$) or the process ID of the process activated by the edge device Ei.

Figure 8:
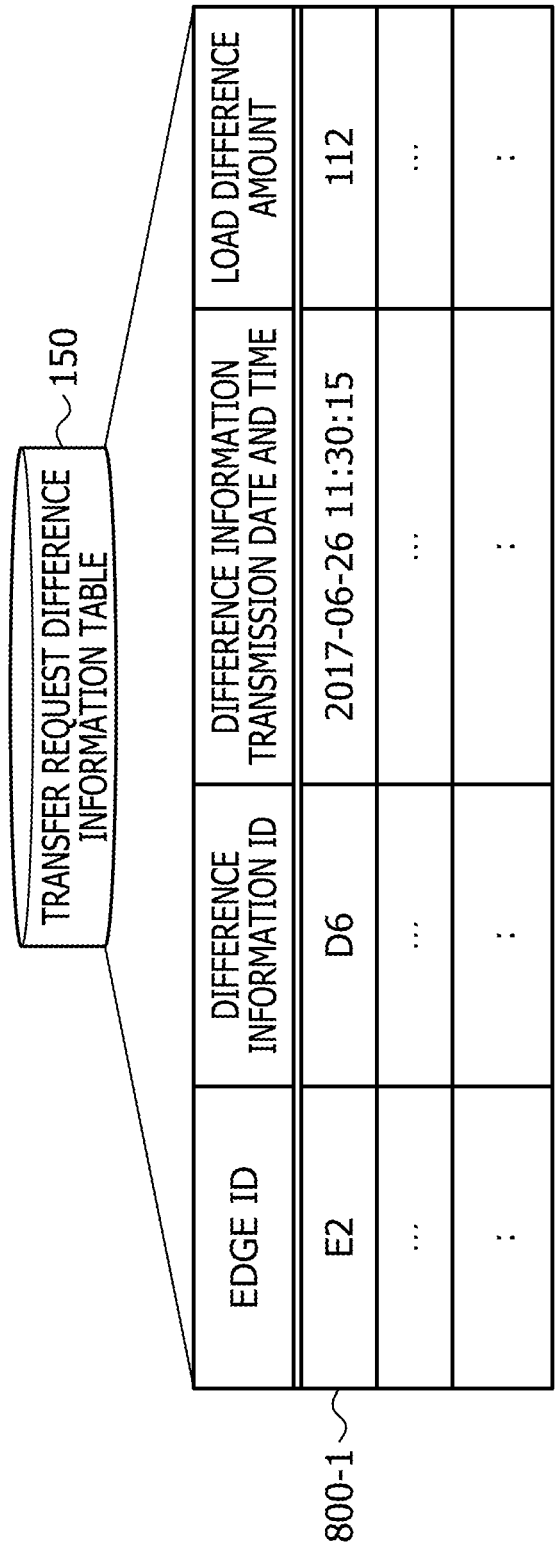
FIG. 8 is an explanatory diagram illustrating an example of storage contents of a transfer request difference information table.

FIG. 8 is an explanatory diagram illustrating an example of storage contents of the transfer request difference information table 150. In FIG. 8, the transfer request difference information table 150 has fields of an edge ID, a difference information ID, a difference information transmission date and time, and a load difference amount, and stores transfer request difference information (for example, transfer request difference information 800-1) as a record by setting information in each field.

The edge ID is an identifier for uniquely identifying the edge device as the requesting source that has requested the transfer of the difference information to the management device 101. The difference information ID is an identifier for uniquely identifying the difference information on the load state of the edge device as the requesting source. The difference information transmission date and time indicates a date and time (year, month, day, hour, minute, second) at which the edge device as the requesting source transmitted the transfer request of the difference information to the edge device Ei. The load difference amount represents a difference between the amount of load of the device itself recognized by the edge device as the requesting source and the amount of load of the edge device as the requesting source recognized by the management device 101.

For example, the transfer request difference information 800-1 indicates the difference information ID "D6" the difference information transmission date and time "2017-06-26 11:30:15", and the load difference amount "112" of the difference information which the edge device E1 has been requested by the edge device E2 to transfer.

Functional Configuration Example of Edge Device Ei

Figure 9:
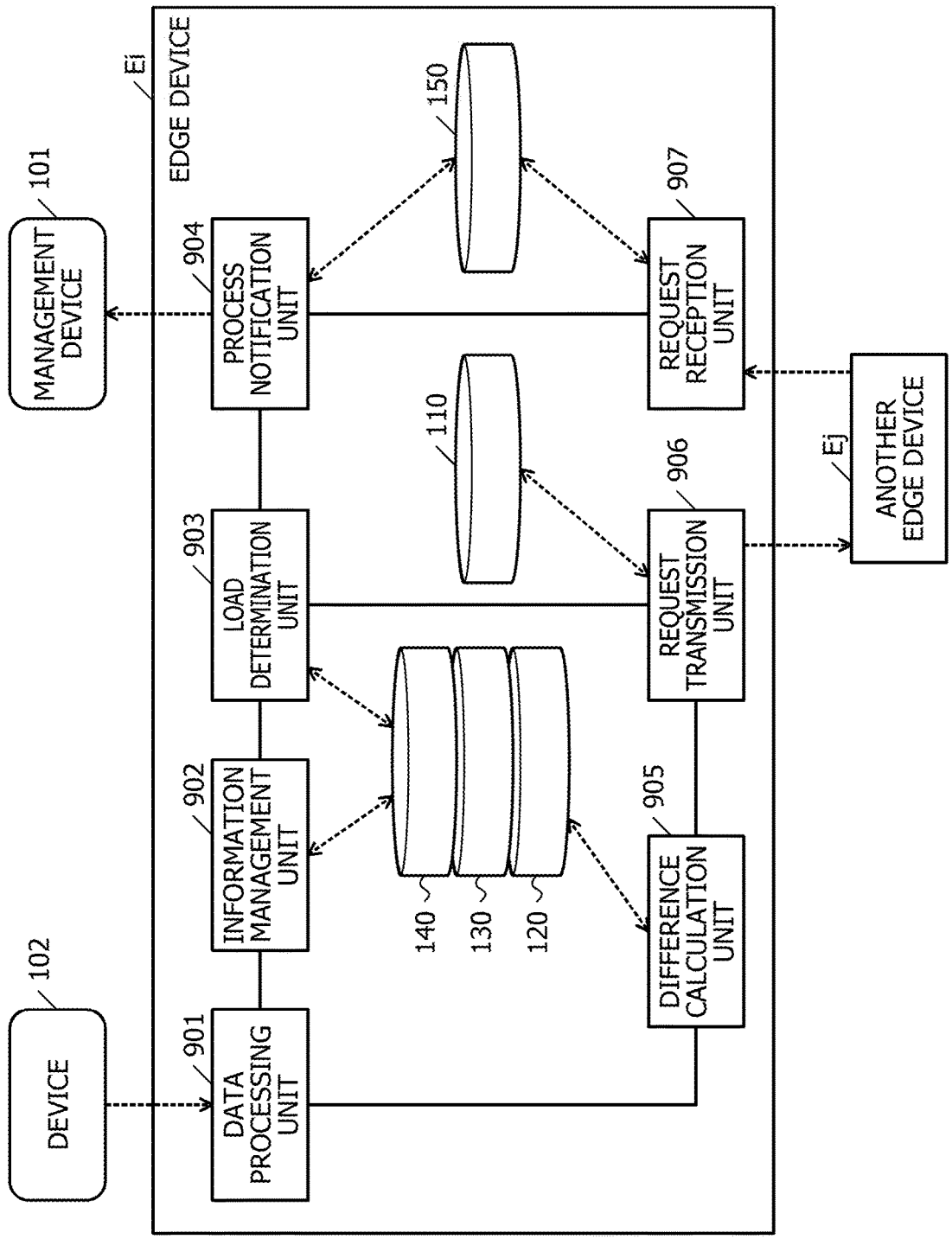
FIG. 9 is a block diagram illustrating a functional configuration example of the edge device.

FIG. 9 is a block diagram illustrating a functional configuration example of the edge device Ei. In FIG. 9, the edge device Ei includes a data processing unit 901, an information management unit 902, a load determination unit 903, a process notification unit 904, a difference calculation unit 905, a request transmission unit 906, and a request reception unit 907. The data processing unit 901 to the request reception unit 907 function as control units, and implement their functions, for example, by causing the CPU 301 to execute programs stored in storage devices such as the memory 302 and the disk 305 or by the I/F 303 illustrated in FIG. 3. The processing result of each functional unit is stored in storage devices such as the memory 302 and the disk 305, for example.

When the data processing unit 901 receives the data transmitted from the device 102, the data processing unit 901 processes the received data. For example, upon receiving the data transmitted from the device 102 by short-range wireless communication or the like, the data processing unit 901 activates a process corresponding to the contents of the received data.

For example, when the data processing unit 901 receives the sensing data from the environment sensor that is the device 102, the data processing unit 901 activates the process of performing a simple calculation on the received sensing data. When the data processing unit 901 receives the image captured by the camera which is the device 102, the data processing unit 901 activates the process of analyzing the received image.

When the process is activated by the data processing unit 901, the information management unit 902 updates the state of the process. In the following description, a process newly activated by the edge device Ei may be referred as "a new process" and a process that is already activated and is being performed may be referred to as "an existing process".

For example, when the new process is activated, the information management unit 902 registers the first process information of the new process in the first process information management table 130. More specifically, the information management unit 902 registers the load ($W_{proc\_k}$) and the update time in association with the process ID of the new process. Note that, at this point, the load ($W_{proc\_k}$) is "0". The update time is the time at which the new process is activated. In this way, new first process information is stored as a record in the first process information management table 130.

When the new process is activated, the information management unit 902 updates the first process information of the existing process in the first process information management table 130. More specifically, the information management unit 902 uses, for example, the following Expression (1) to update the load $W_{proc\_k}$ of the existing process. The information management unit 902 updates the update time of the existing process to the current time.

$$W_{proc\_k} = \Sigma_k C \cdot t_k / N_k \quad (1)$$

Where C is a variable representing the processing capacity of the edge device Ei. Since it may be assumed that the variable C is not changed within a single edge device Ei, the load may be normalized for each edge device Ei when the variable C is set to the processing capacity "1" or the processing capacity "10". t is a variable representing the processing time of the process. The processing time is the time required for processing, and may be expressed by the difference between the current time and the update time (previous update time). N is a variable representing the number of current processes. k is a variable representing each section between the activation and the end of the process.

For example, in a case where the edge device Ei with the processing capacity "10" performs two processes, the edge device Ei performs processing for one process with processing capacity "5" according to C/N. The load of the process may be calculated by multiplying the processing capacity "5" by the processing time. In a case where the processing capacity is "1", the variable C may be omitted from the above Expression (1).

In this way, the load (Wproc_k) of the existing process of the edge device Ei may be updated each time a new process is activated.

When the existing process ends the information management unit 902 updates the state of the existing process. For example, when the existing process ends, the information management unit 902 updates the first process information of each existing process in the first process information management table 130. More specifically, the information management unit 902 uses, for example, the above Expression (1) to update the load ($W_{proc\_k}$) of the existing process. The information management unit 902 updates the update time of the existing process to the current time.

Next, the information management unit 902 calculates the average of the movement load of the existing process that has ended. The information management unit 902 identifies the program ID corresponding to the process ID of the existing process that has ended. The program ID corresponding to the process ID may be obtained from, for example, the function of the OS.

The information management unit 902 updates the load ($W_{proc}$) in the load management table 120 corresponding to the identified program ID with the calculated movement average. The information management unit 902 deletes from the first process information management table 130 the entry corresponding to the process ID of the existing process that has ended.

The information for calculating the average of the movement of the load of the existing process is stored in the storage devices such as the memory 302 and the disk 305, for example in association with the program ID. The information for calculating the average of the movement of the load of the existing process is, for example, the load of the existing process calculated in the past.

In this way, the load ($W_{proc}$) of the edge device Ei corresponding to the existing process may be updated at the timing when the existing process ends. However, the load ($W_{proc}$) corresponding to each program ID in the load management table 120 may be a preset fixed value.

When the new process is activated, the load determination unit 903 determines whether the load ($W_{proc}$) of the new process is equal to or greater than the threshold value α. The threshold value α may be set to any value. For example, when load balancing or the like is performed for the edge devices E1 to En, as long as the load ($W_{proc}$) of the new process is equal to or greater than the threshold value α, the threshold value α is set to a value that may be large enough to the extent that the load of the new process is not be ignored. In other words, when the load ($W_{proc}$) of the new process is less than the threshold value α, there is a high possibility that the new process will be completed within a short time, whereby it may be said that there is little necessity of transmitting an activation notification to the management device 101 to predict the end time of the process.

For example, the load determination unit 903 identifies the program ID corresponding to the process ID of the new process. The load determination corresponding 903 refers to the load management table 120 to identify the load ($W_{proc}$) corresponding to the identified program ID. The load determination unit 903 determines whether the identified load ($W_{proc}$) is equal to or greater than the threshold value α.

In a case where the load determination unit 903 determines that the load ($W_{proc}$) of the new process is equal to or greater than the threshold value α, the process notification unit 904 transmits a state notification message to the management device 101. For example, the state notification message is a notification of the activation of the new process whose load ($W_{proc}$) is equal to or greater than the threshold value α.

The state notification message includes the load ($W_{proc}$) and the activation time of the new process. The activation time is a date and time (for example, year, month, day, hour, minute, second) at which the new process is activated. The state notification message may include the process ID of the new process.

The difference calculation unit 905 calculates a difference between the amount of load of the device itself recognized by the edge device Ei and the amount of load of the edge device Ei recognized by the management device 101. In the following description, a difference between the amount of load of the device itself recognized by the edge device Ei and the amount of load of the edge device Ei recognized by the management device 101 may be referred to as "a load difference amount LD".

For example, when a new process is activated, the difference calculation unit 905 refers to the first process information management table 130 and the second process information management table 140 to calculate the load difference amount LD. The specific processing for calculating the load difference amount LD will be described later with reference to FIG. 11.

The request transmission unit 906 transmits difference information on the load state of the device itself to another edge device Ej having a higher transmission frequency of the state notification message to the management device 101 than the device itself. The difference information on the load state of the device itself is information indicating a difference between the amount of load of the device itself recognized by the edge device Ei and the amount of load of the edge device Ei recognized by the management device 101, for example, information indicating the load difference amount LD.

For example, in a case where the load determination unit 903 determines that the load ($W_{proc}$) of the new process is less than the threshold value α, the request transmission unit 906 determines whether the load difference amount LD calculated by the difference calculation unit 905 is equal to or greater than a predetermined value β. The predetermined value β may be set to any value. For example, when load balancing or the like is performed for the edge devices E1 to En, the predetermined value β is set to a value that may be said to be large enough to the extent that the load difference amount LD is not be ignored if the load difference amount LD is equal to or greater than the predetermined value β.

In a case where the load difference amount LD is equal to or greater than the predetermined value β, the request transmission unit 906 identifies the target edge with reference to the target edge management table 110 illustrated in FIG. 4. On this occasion, the request transmission unit 906 identifies, for example, the first naked target edge. The stored contents of the target edge management table 110 are updated in accordance with the target edge updating request from the management device 101, for example.

The request transmission unit 906 transmits, to the identified target edge, a request for transfer of the difference information indicating the load difference amount LD to the management device 101. For example, the request transmission unit 906 requests another edge device Ej to transfer the difference information indicating the load difference amount LD to the management device 101.

In the following description, a request for transfer of the difference information indicating the load difference amount LD to the management device 101 may be referred to as "a difference information packet".

The difference information packet includes, for example, an edge ID, a difference information ID, a difference information transmission date and time, and a load difference amount. The edge ID is the edge ID of the edge device Ei which is the requesting source. The difference information ID is the difference information ID of the difference information indicating the load difference amount LD. The difference information transmission date and time is the date and time when the difference information packet has been transmitted. The load difference amount is the load difference amount LD.

In this way, it is possible to request another edge device Ej having a high transmission frequency of the state notification message to transfer the difference information on the load state of the device itself (edge device Ei) to the management device 101. In a case where the load difference amount LD is less than the predetermined value β, it is possible to avoid communication occurring frequently between edge devices by not requesting transfer of difference information.

The request reception unit 907 receives, from another edge device Ej, receives the difference information on the load state of another edge device Ej. For example, the request reception unit 907 receives the difference information packet from another edge device Ej. The difference information packet from another edge device Ej is a request for transfer of the difference information indicating the load difference amount LD of another edge device Ej to the management device 101. For example, in a case where the device itself is a target edge, the request reception unit 907 receives from another edge device Ej a request for transfer of the difference information to the management device 101.

In a case where the request reception unit 907 receives a difference information packet from another edge device Ej, the request reception unit 907 registers, in the transfer request difference information table 150, the edge ID, the difference information ID, the difference information transmission date and time, and the load difference amount in association with each other. In this way, it is possible to register, in the transfer request difference information table 150, the difference information the transfer of which has been requested by another edge device Ej.

In a case where difference information from another edge device Ej is received by the request reception unit 907, the process notification unit 904 transmits the state notification message in which the difference information from another edge device Ej is included when transmitting the state notification message to the management device 101. For example, the process notification unit 904 transmits, to the management device 101, the state notification message in which the transfer request difference information included in the transfer request difference information table 150 is included.

In this way, when notifying the management device 101 from the edge device Ei that the new process whose load ($W_{proc}$) is equal to or greater than the threshold value α is activated by the edge device Ei, it is possible to transfer the difference information the transfer of which has been requested by another edge device Ej.

In a case where the target edge is the device itself, the process notification unit 904 transmits, to the management device 101, a state notification message including the load difference amount LD of the device itself calculated by the difference calculation unit 905. In a case where the target edge is the device itself, for example, the request transmission unit 906 may register the load difference amount LD of the device itself in the transfer request difference information table 150 illustrated in FIG. 8. When the process notification unit 904 transmits the state notification message to the management device 101, the process notification unit 904 may transmit the state notification message in which the transfer request difference information including the load difference amount LD of the device itself may be included.

In a case where the state notification message is transmitted to the management device 101 by the process notification unit 904, the information management unit 902 updates the amount of load of the device itself recognized by the management device 101. For example, the information management unit 902 registers second process information on a new process whose load m is equal to or greater than the threshold value α in the second process information management table 140. The information management unit 902 updates the second process information on the existing process in the second process information management table 140.

More specifically, for example, based on the load ($W_{proc}$) and the activation time of the new process, the information management unit 902 predicts the end time of the new process. On this occasion, the information management unit 902 may further take into consideration the processing capacity of the device itself to predict the end time of the new process.

The information management unit 902 stores the edge ID of the edge device Ei, the activation time of the new process, and the predicted end time in association with each other in the second process information management table 140. On this occasion, the information management unit 902 may also store the load ($W_{proc}$) and the process ID of the new process. In this way, new second process information is stored as a record in the second process information management table 140.

The information management unit 902 refers to the second process information management table 140 to predict the new end time of the existing process. The information management unit 902 updates the expected process end time in the second process information management table 140 with respect to the existing process whose new end time is predicted.

The specific process for predicting the process end time based on the load ($W_{proc}$) and the activation time of the process will be described later with reference to FIG. 10.

The information management unit 902 detects the end of the existing process based on the predicted end time of the existing process. In a case where the information management unit 902 detects the end of the existing process, the information management unit is it 902 predicts a new end time of another existing process whose load ($W_{proc}$) is equal to or greater than the threshold value α.

For example, the information management unit 902 refers to the second process information management table 140 to monitor whether the expected process end time of any one of the entries has passed. In a case where the expected process end time of any one of the entries has passed, the information management unit 902 deletes the entry from the second process information management table 140, and updates the expected process end time of the remaining entries in the second process information management table 140. For example, the information management unit 902 predicts a new end time of the existing process whose load ($W_{proc}$) is equal to or greater than the threshold value α. The information management unit 902 updates the expected process end time in the second process information management table 140 with respect to the existing process whose new end time is predicted.

In the case where the difference information packet is transmitted to the target edge by the request transmission unit 906, the information management unit 902 transmits may corrects the error between the amount of load of the device itself recognized by the device itself and the amount of load of the device itself recognized by the management device 101. Alternatively, in a case where the information management unit 902 receives a transfer completion notification from the target edge, the information management unit 902 may corrects the error between the amount of load of the device itself recognized by the device itself and the amount of load of the device itself recognized by the management device 101.

The transfer completion notification is a notification indicating that the difference information of the edge device Ei has been transferred from the target edge to the management device 101. For example, the information management unit 902 updates the second process information management table 140 at the timing at which the difference information packet is transmitted to the target edge or at the timing at which the transfer completion notification is received from the target edge.

More specifically, for example, the information management unit 902, based on the calculated difference load amount LD, predicts a new end time for the existing process in the second process information management table 140. The information management unit 902, based on the predicted new end time, updates the expected process end time of the existing process in the second process information management table 140.

In this way, it is possible to correct an error between the amount of load of the device itself recognized by the device itself and the amount of load of the device itself recognized by the management device 101 at the timing of transmitting the difference information packet to the target edge or at the timing of receiving the transfer completion notification from the target edge.

Figure 12:
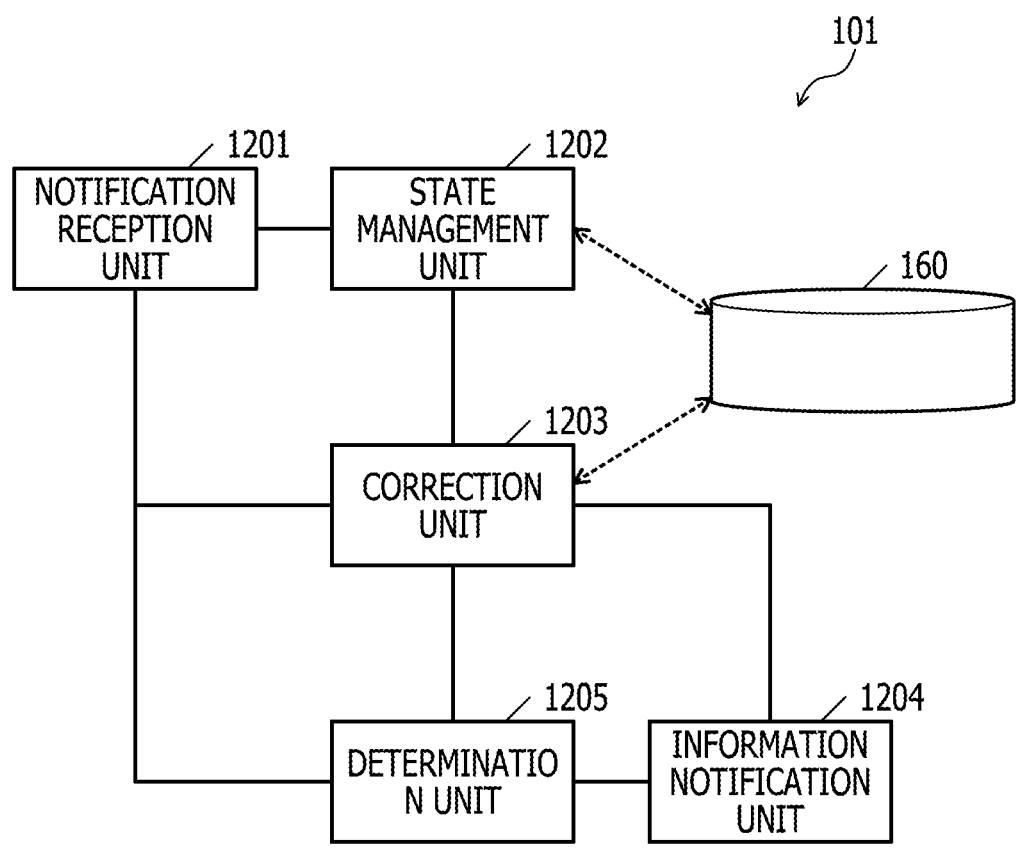
FIG. 12 is a block diagram illustrating a functional configuration example of a management device.
Figure 13:
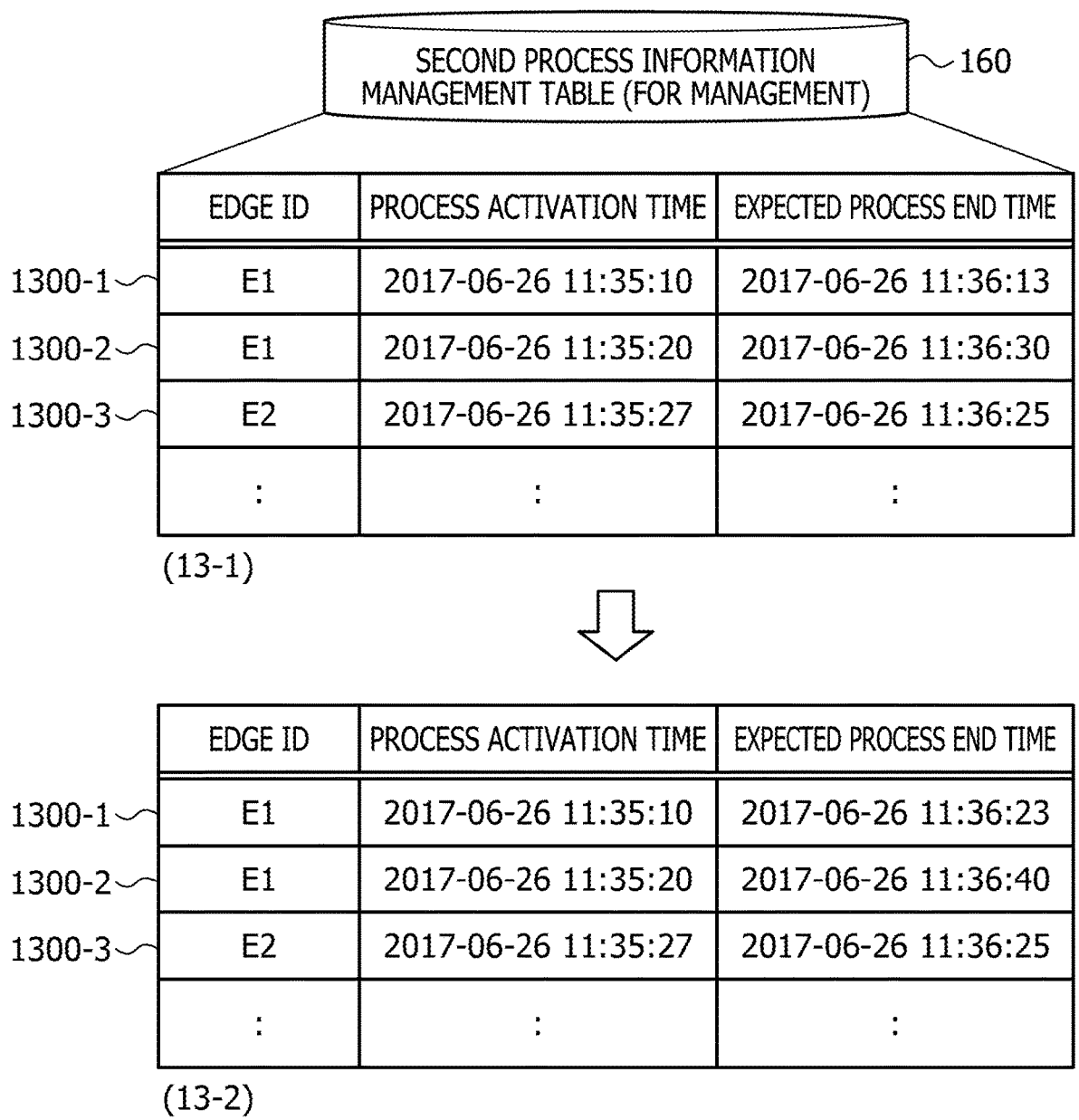
FIG. 13 is an explanatory diagram illustrating an update example of the second process information management table (for management)

Since the prediction example of a new end time of the existing process in the second process information management table 140 based on the difference load amount LD of the edge device Ei is the same as the prediction example of a correction unit 1203 (see FIG. 12) of the management device 101 which will be described later with reference to FIG. 13, illustration and description are omitted.

Although the case where the request transmission unit 906 refers to the target edge management table 110 to transmit the difference information packet to the identified target edge is described in the above, the present embodiment is not limited to this. For example, the request transmission unit 906 may broadcast the difference information packet to the remaining edge devices other than the device itself among the edge devices E1 to En. In this case, when the state notification message is transmitted to the management device 101 the difference information packet of the edge device Ei is transmitted to any of the edge devices except the edge device Ei.

However, the management device 101 manages the difference information packet using the difference information ID so that the same difference information packet may not be duplicated even if the same difference information packet is transmitted a plurality of times. The transfer completion notification of the difference information packet may be broadcast in response to the fact that another edge device Ej has transmitted the state notification message including the difference information packet of the edge device Ei. In this way, it is possible to avoid duplicate transmission of the same difference information packet to the management device 101.

Prediction of Process End Time

Next, with reference to FIG. 10, the specific process for predicting the process end time based on the load ($W_{proc}$) and the activation time of the process will be described. In the following description, processes A and B have loads ($W_{proc}$) which are equal to or greater than the threshold value α.

Figure 10:
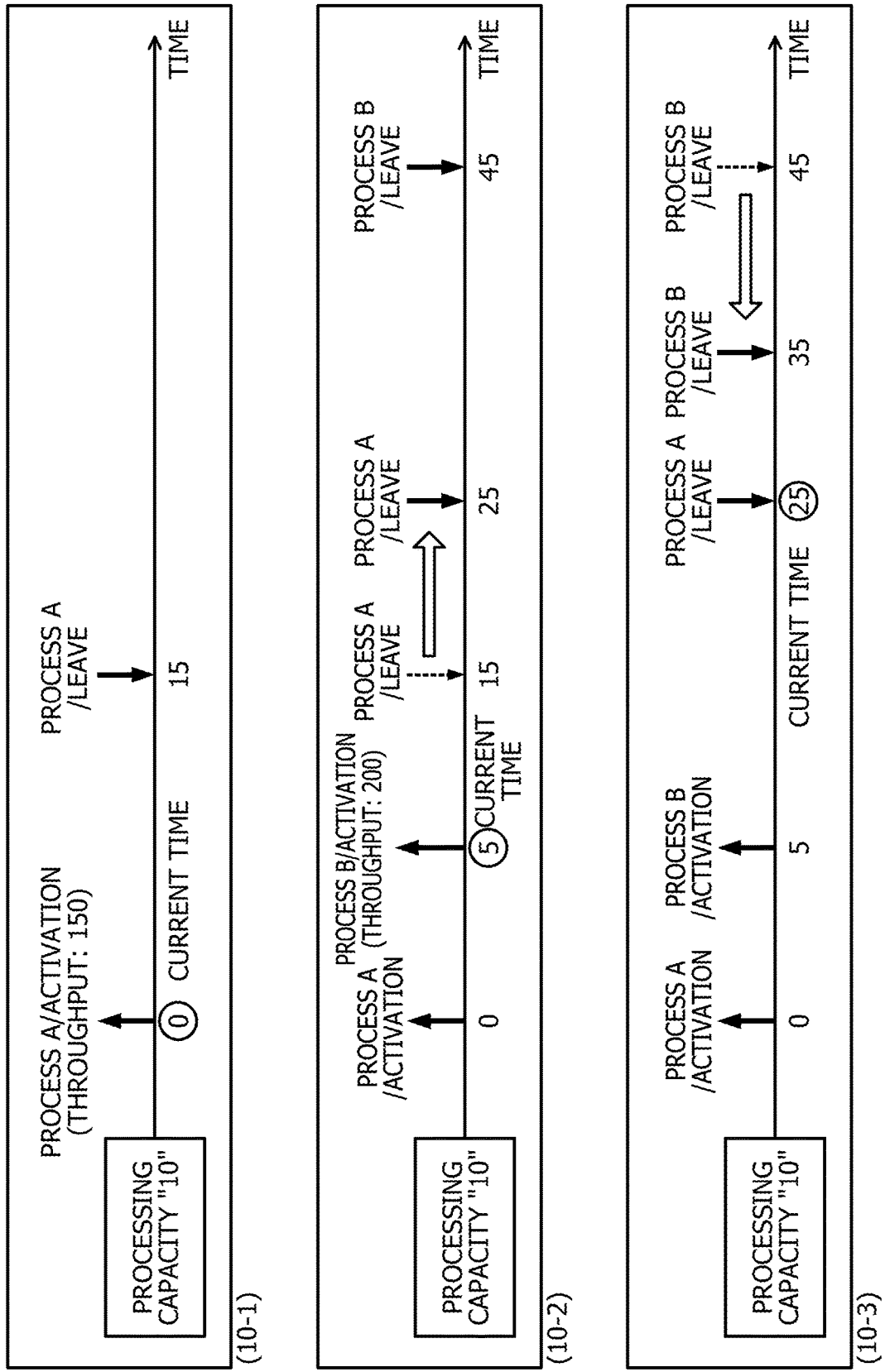
FIG. 10 is a diagram for explaining the prediction of an end time of the process.

FIG. 10 is a diagram for explaining the prediction of an end time of the process. As illustrated in (10-1) of FIG. 10, it is assumed that the process A (new process) whose load ($W_{proc}$) is "150" is activated by the edge device Ei at the time "0". The processing capacity of the edge device Ei is set to "10".

In this case, since the load "150" of one process A is processed with the processing capacity "10", the information management unit 902 predicts the end time "15" (=load/processing capacity) of process. For example, in a case where the activation time is set as the current time, the information management unit 902 predicts that process A leaves when the time elapses from the current time to the time "15". The time unit is not particularly limited. For example, time, minute, second, and so forth may be used.

Next, as illustrated in (10-2) of FIG. 10, it is assumed that the process B (new process) whose load ($W_{proc}$) is "200" is activated at the current time when the time has elapsed from the time "0" when the process A was activated to the time "5".

In this case, the information management unit 902 calculates the remaining load of the process A. For example, the time period during which one process A was processed using all of the processing capacity "10" is from the time "0" to the time "5". For this reason, first, the information management unit 902 calculates the load processed from the time "0" to the time "5" as "50" (=(processing capacity/the number of processes up to the current time)×(current time—activation time of process A). The information management unit 902 calculates the remaining load of the process A as "100" (=load "150"—load "50").

On the other hand, when the process B is activated by the edge device Ei, since the two processes A and B are performed after the time "5", all of the processing capacity "10" is used. For example, the edge device Ei performs each of the process A and the process B with the processing capacity "5" (=processing capacity/the number of processes).

For this reason, the information management unit 902 calculates the processing time for processing the remaining load "100" of the process A with the processing capacity "5" as "20" (=load/processing capacity). Since the current time "5", the information management unit 902 predicts a new end time "25" of the process A (=current time+processing time).

When the new end time of the process is predicted, for example, the expected process end time of the process in the second process information management table 140 is updated.

Since the process B has not yet been performed, the information management unit 902 calculates the processing time for processing the remaining load "200" of the process B with the processing capacity "5" as "40" (=load/processing capacity). Since the current time is "5", the information management unit 902 predicts the end time "45" the process B (=current time+processing time).

Next, as illustrated in (10-3) of FIG. 10, when the current time has passed the end time "25" of the process A, the process A ends and leaves. Before the time "25", the edge device Ei uses the processing capacity "5" to perform the two processes A and B. The elapsed time from the activation time of the process B to the current time is "20" (=the time "25"–the time "5").

For this reason, the information management unit 902 calculates the load processed from the time "5" to the time "25" as "100" (=(processing capacity/the number of processes performed until the current time)×(current time—activation time of process B). The information management unit 902 calculates the remaining load of the process B as "100" (=load "200"–load "100").

On the other hand, when process A leaves (ends) in the edge device Ei, since one processes B is performed after the time "25", all of the processing capacity "10" is used. For example, the edge device Ei performs the process B with the processing capacity "10" (=processing capacity/the number of new processes).

For this reason, the information management unit 902 calculates the processing time for processing the remaining load "100" of the process B with the processing capacity "10" as "10" (=load/processing capacity). Since the current time is "25", the information management unit 902 predicts a new end time "35" of the process B (=current time+processing time).

Calculation of Load Difference Amount LD

Next, with reference to FIG. 11, specific processing for calculating the load difference amount LD will be described. In this case, the edge device E1 as an example of the edge device Ei will be described.

Figure 11:
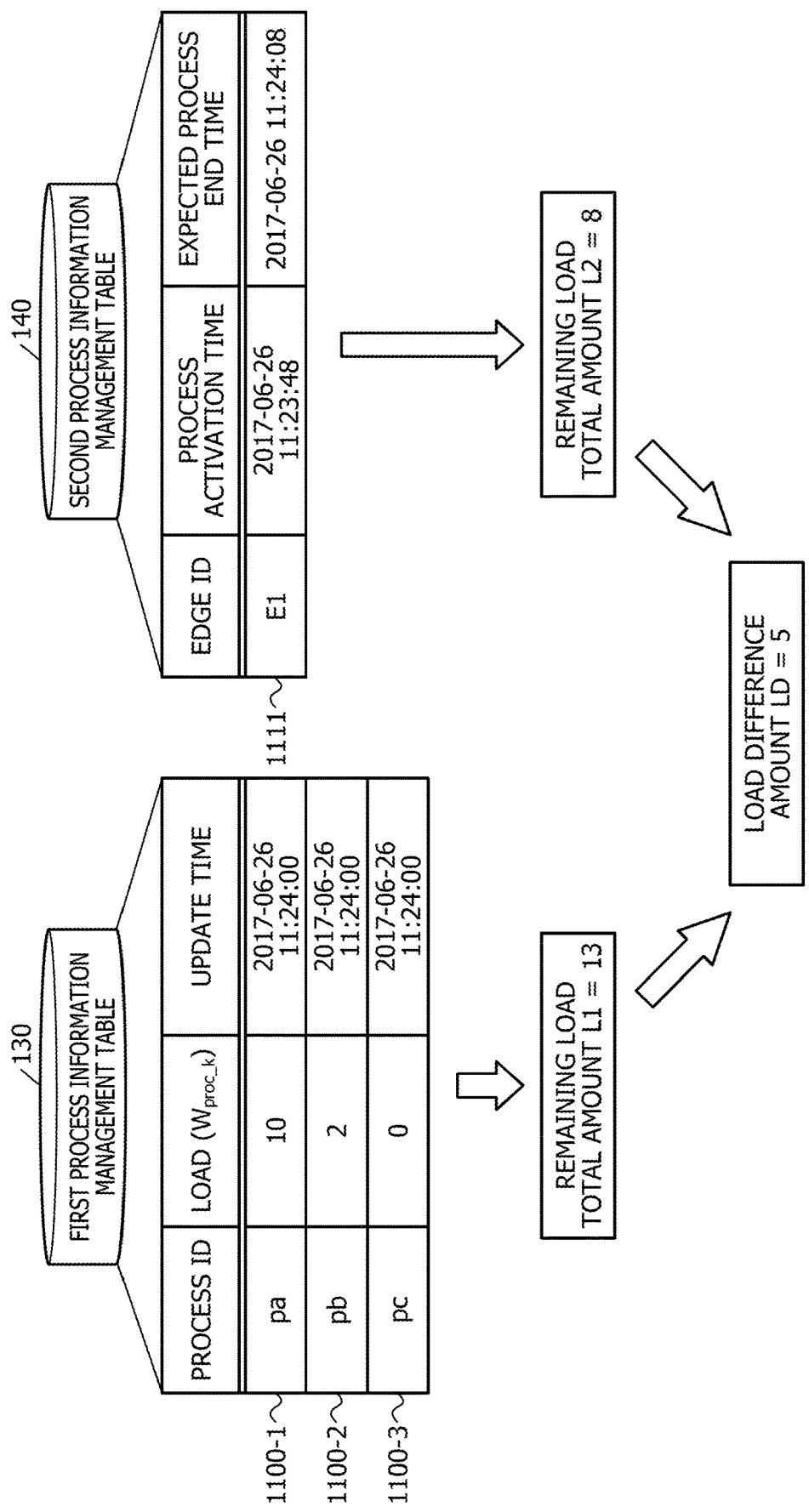
FIG. 11 is an explanatory diagram illustrating a calculation example of a load difference amount.

FIG. 11 is an explanatory diagram illustrating a calculation example of the load difference amount LD. In the example of FIG. 11, it is assumed that first process information 1100-1 to 1100-3 is stored in the first process information management table 130. It is assumed that second process information 1100-1 is stored in the second process information management table 140.

Let processes pa, pc indicated by first process information 1100-1, 1100-3 be processes whose loads ($W_{proc}$) are equal to or greater than threshold value α. Let process pb indicated by first process information 1100-2 be a process whose load ($W_{proc}$) is less than threshold value α. The current time, for example, the time at which the new process (process pc) was activated is referred to as "2017-06-26 11:24:00".

In this case, first, the difference calculation unit 905 refers to the first process information management table 130 to acquire processes ID and loads ($W_{proc\_k}$) of all the entries. Next, the difference calculation unit 905 identifies the program ID corresponding to the acquired process ID. The difference calculation unit 905 refers to the load management table 120 to identify the load ($W_{proc}$) corresponding to the identified program ID.

In this case, the program ID corresponding to the processes ID "pa, pc" is set to "PG #", and the load ($W_{proc}$) corresponding to the program ID "PG #" is set to "20". The program ID corresponding to the process ID "pb" is set to "PG$", and the load ($W_{proc}$) corresponding to the program ID "PG$" is set to "5".

Next, the difference calculation unit 905 refers to the first process information management table 130 to calculate the remaining load total amount L1 of the edge device E1 by obtaining the sum of ($W_{proc}-W_{proc\_k}$) of all the entries using Expression (2) below. The remaining load total amount L1 is the amount of load of the device itself recognized by the edge device Ei, which is the total amount of the remaining load that is expectedly requested to be processed by the edge device E1. ($w_{proc}-W_{proc\_k}$) represents the remaining load dealt with until the process being performed by the edge device Ei ends.

$$L1 = \Sigma(W_{proc} - W_{proc\_k}) \quad (2)$$

Where the entry whose value is negative is set "0", and the latest entry which is just registered is excluded. In the example of FIG. 11, the remaining load total amount L1 is "13" (=(20-10)+(5-2)).

Next, the difference calculation unit 905 refers to the second process information management table 140 to calculate the remaining load total amount L2 of the edge device E1 by obtaining the sum of (expected process end time–current time) of all the entries using Expression (3) below. The remaining load total amount L2 is the amount of load of the edge device E1 recognized by the management device 101, and is the total amount of the remaining load of the edge device E1 as viewed from the cloud.

$$L2 = \Sigma(\text{expected process end time} - \text{current time}) \quad (3)$$

In the example of FIG. 11, the remaining load total amount L2 is "8" (=(2017-06-26 11:24:08)−(2017-06-26 11:24:00)).

The difference calculation unit 905 calculates the load difference amount LD based on the calculated remaining load total amounts L1 and L2. For example, the difference calculation unit 905 calculates the load difference amount LD by subtracting the remaining load total amount L2 from the remaining load total amount L1. In the example of FIG. 11, the load difference amount LD is "5" (=13-8). This load difference amount LD "5" corresponds to the amount for the process pb whose activation has not been notified to the management device 101.

In this way, the edge device E1 may calculate the difference in load with the management device 101 where the difference is caused by not having made a notification of the activation of the process whose load ($W_{proc}$) is less than the threshold value α.

Functional Configuration Example of Management Device 101.

FIG. 12 is a block diagram illustrating a functional configuration example of the management device 101. In FIG. 12, the management device 101 includes a notification reception unit 1201, a state management unit 1202, the correction unit 1203, an information notification unit 1204, and a determination unit 1205. The notification reception unit 1201 to the determination unit 1205 function as control units, and implement their functions for example, by causing the CPU to execute programs stored in storage devices such as a memory and a disk of the management device 101, or, by the I/F (see, for example, FIG. 3). The processing result of each functional unit is stored in storage devices such as a memory and a disk, for example.

The notification reception unit 1201 receives the state notification message from the edge device Ei. The state notification message is a notification of the activation of a new process whose load ($W_{proc}$) is equal to or greater than the threshold value α, and includes the load ($W_{proc}$) and the activation time of the new process. The state notification message may include the process ID of the new process.

The state management unit 1202 manages the state of the edge device Ei. For example, when receiving the state notification message from the edge device Ei, the state management unit 1202 registers the second process information on the new process in the second process information management table (for management) 160.

More specifically, the state management unit 1202 predicts the end time of the new process based on, for example, the load ($W_{proc}$) and the activation time of the new process included in the state notification message. On this occasion, the state management unit 1202 may further take into consideration the processing capacity of the edge device Ei to predict the end time of the new process.

The state management unit 1202 stores the edge ID of the edge device Ei, the activation time of the new process, and the predicted end time in association with each other in the second process information management table (for management) 160. On this occasion, the state management unit 1202 may also store the load ($W_{proc}$) of the new process and the process ID. In this way, new second process information is stored as a record in the second process information management table (for management) 160.

When the state management unit 1202 detects the end of the existing process of the edge device Ei, the state management unit 1202 predicts a new end time of the remaining existing processes of the edge device Ei. The state management unit 1202 updates the expected process end time in the second process information management table (for management) 160 with respect to the remaining existing processes whose new end time is predicted.

The end of the existing process of the edge device Ei is detected based on, for example, the expected process end time in the second process information management table (for management) 160. For example, the state management unit 1202 refers to the second process information management table (for management) 160 detects the end of the existing process in response to the fact that the expected process end time of the existing process of any edge device Ei has passed.

Since the specific process for predicting the process end time is the same as the process of the information management unit 902 of the edge device Ei described with reference to FIG. 10, a detailed description thereof will be omitted.

In a case where the correction unit 1203 receives from another edge device Ej the state notification message including difference information of the edge device Ei, the correction unit 1203 corrects the load state of the edge device Ei based on the difference information. In a case where the correction unit 1203 receives from the edge device Ei the state notification message including difference information of the edge device Ei, the correction unit 1203 corrects the load state of the edge device Ei based on the difference information. The difference information includes, for example, an edge ID, a difference information ID, a difference information transmission date and time, and a load difference amount.

The edge ID is the edge ID of the edge device Ei. The difference information ID is an identifier for uniquely identifying the difference information. The difference information transmission date and time is the date and time (year, month, day, hour, minute, second) at which the edge device Ei transmitted the transfer request of difference information to another edge device Ej. The load difference amount indicates the load difference amount LD of the edge device Ei.

For example, the correction unit 1203 predicts a new end time of the existing process activated by the edge device Ei based on the load difference amount LD of the edge device Ei included in the difference information. The correction unit 1203 uses the predicted new end time to update the expected process end time in the second process information management table (for management) 160.

A prediction example of a new end time of the existing process based on the load difference amount LD of the edge device Ei will be described later with reference to FIG. 13.

In a case where the information notification unit 1204 receives the state notification message including the difference information of the edge device Ei, or in a case where the correction unit 1203 completes the correction of the load state of the edge device Ei, the information notification unit 1204 may transmits an update completion notification to the edge device Ei. The update completion notification is a notification indicating that the correction of the load state of the edge device Ei is completed.

The transmission destination of the update completion notification may be another edge device Ej that is the source of the state notification message including the difference information of the edge device Ei. In this case, in a case where another edge device Ej receives from the management device 101 the update completion notification indicating that the correction of the load state of the edge device Ei has been completed, another edge device Ej transfers the update completion notification to the edge device Ei.

The determination unit 1205 determines the target edge from the edge devices E1 to En based on the frequency at which the notification reception unit 1201 has received respective state notification messages of the edge devices E1 to En. The target edge is an edge device as the requesting source that requests the transfer of the difference information on the load state of the edge device Ei to the management device 101. For example, the determination unit 1205 counts respective number of times the edge devices E1 to En received the state notification message within the most recent certain period. The determination unit 1205 determines, as the target edges, the top N (for example, N=3) edge devices in descending order of the counted number of times.

The information for identifying the date and time when the state notification message was received from the edge device Ei is stored in a storage device such as a memory or a disk, for example, in association with the edge ID of the edge device Ei. The certain period may be set to any period.

In this way, it is possible to determine, as the target edges, the top N edge devices in descending order of the transmission frequency of the state notification message within the most recent certain period. The determination unit 1205 may determine, as the target edge, the edge device that has received the state notification message most recently among the edge devices E1 to En.

The timing for determining the target edge may be, for example, the timing when the state notification message is received from any edge device Ei among the edge devices E1 to En, or the predetermined timing (for example, for every hour, or for every day).

The information notification unit 1204 transmits, to the edge devices E1 to En, information for identifying the target edge determined by the determination unit 1205. For example, it is assumed that the top three edge devices in descending order of the reception frequency of the state notification message within the most recent certain period are determined as target edges. In this case, the information notification unit 1204 notifies the edge devices E1 to En of the target edge updating request including the information for identifying the first to third ranked target edges. When each edge device Ei receives the target edge updating request from the management device 101, each edge device Ei updates the target edge management table 110 based on the received target edge updating request.

Prediction Example of New End Time of Existing Process

Next, with reference to FIG. 13, a prediction example of a new end time of an existing process based on the load difference amount LD of the edge device Ei will be described.

FIG. 13 is an explanatory diagram illustrating an update example of the second process information management table (for management) 160. In FIG. 13, the second process information management table (for management) 160 has fields of an edge ID, a process activation time, and an expected process end time, and stores the second process information (for example, the second process information 1300-1 to 1300-3) as a record by setting information in each field.

The edge ID is an identifier uniquely identifying the edge device Ei. The process activation time indicates the date and time (year, month, day, hour, minute, second) at which the process was activated by the edge device Ei. The expected process end time indicates the expected date and time (year, month, day, hour, minute, second) at which the process ends at the edge device Ei.

Hereinafter, an example of prediction of a new end time of an existing process activated by the edge device E1 as an example of the edge device Ei will be described. In this case, it is assumed that the load difference amount LD of the edge device E1 included in the difference information of the edge device E1 is set to "20".

In this case, first, the correction unit 1203 extracts, from the second process information management table (for management) 160 in (13-1), an entry corresponding to the edge ID "E1" included in the difference information. The correction unit 1203 uses, for example, the following Expression (4) to calculate a new expected process end time $ET_{new}$ of each entry that has been extracted.

$$ET_{new} = ET + (LD/p) \quad (4)$$

Where $ET_{new}$ is the new end time of the existing process, ET is the current end time of the existing process (expected end time of the current process), LD is the load difference amount, and p is the number of processes operating on edge device Ei and corresponds to the number of extracted entries.

In the example of FIG. 13, the second process information 1300-1, 1300-2 is extracted as an entry corresponding to the edge ID "E1". For this reason, the number p of processes operating on the edge device Ei is 2. In this case, using Expression (4) above, the correction unit 1203 calculates a new expected process end time $ET_{new}$ of the second process information 1300-1. Using Expression (4) above, the correction unit 1203 calculates a new expected process end time $ET_{new}$ of the second process information 1300-2.

The new expected process end time $ET_{new}$ of the second process information 1300-1 is calculated as "2017-06-26 11:36:23"=(2017-06-26 11:36:13)+(20/2).

The new expected process end time $ET_{new}$ of the second process information 1300-2 is calculated as "2017-06-26 11:36:40"=(2017-06-26 11:36:30)+(20/2).

As illustrated in (13-2), the correction unit 1203, based on the calculated new expected process end time $ET_{new}$, updates the respective expected process end times of the second process information 1300-1, 1300-2 in the second process information management table (for management) 160.

Change in Target Edge

As described above, the edge device Ei transmits a request for transfer of the difference information (difference information packet) indicating the load difference amount LD of the device itself to the management device 101 to the target edge having a higher transmission frequency of the state notification message to the management device 101 than the device itself. However, a process whose load ($W_{proc}$) is equal to or greater than the threshold value α may not be activated immediately by the target edge. In this case, the transfer of the difference information of the edge device Ei to the management device 101 may be delayed.

Therefore, in a case where a process whose load ($W_{proc}$) is equal to or greater than the threshold value α is not activated by the target edge even after a certain period t has elapsed since the difference information packet was received from the edge device Ei, a request for retransfer of difference information may be transmitted to the edge device Ei. The request for retransfer of the difference information is a request to transmit, to another target edge different from the self edge, the request for transfer of the difference information to the management device 101. The certain period t may be set to any period. For example, the certain period t is set based on past occurrence intervals of processes whose load ($W_{proc}$) is in the edge devices E1 to En is less than the threshold value α.

Figure 14:
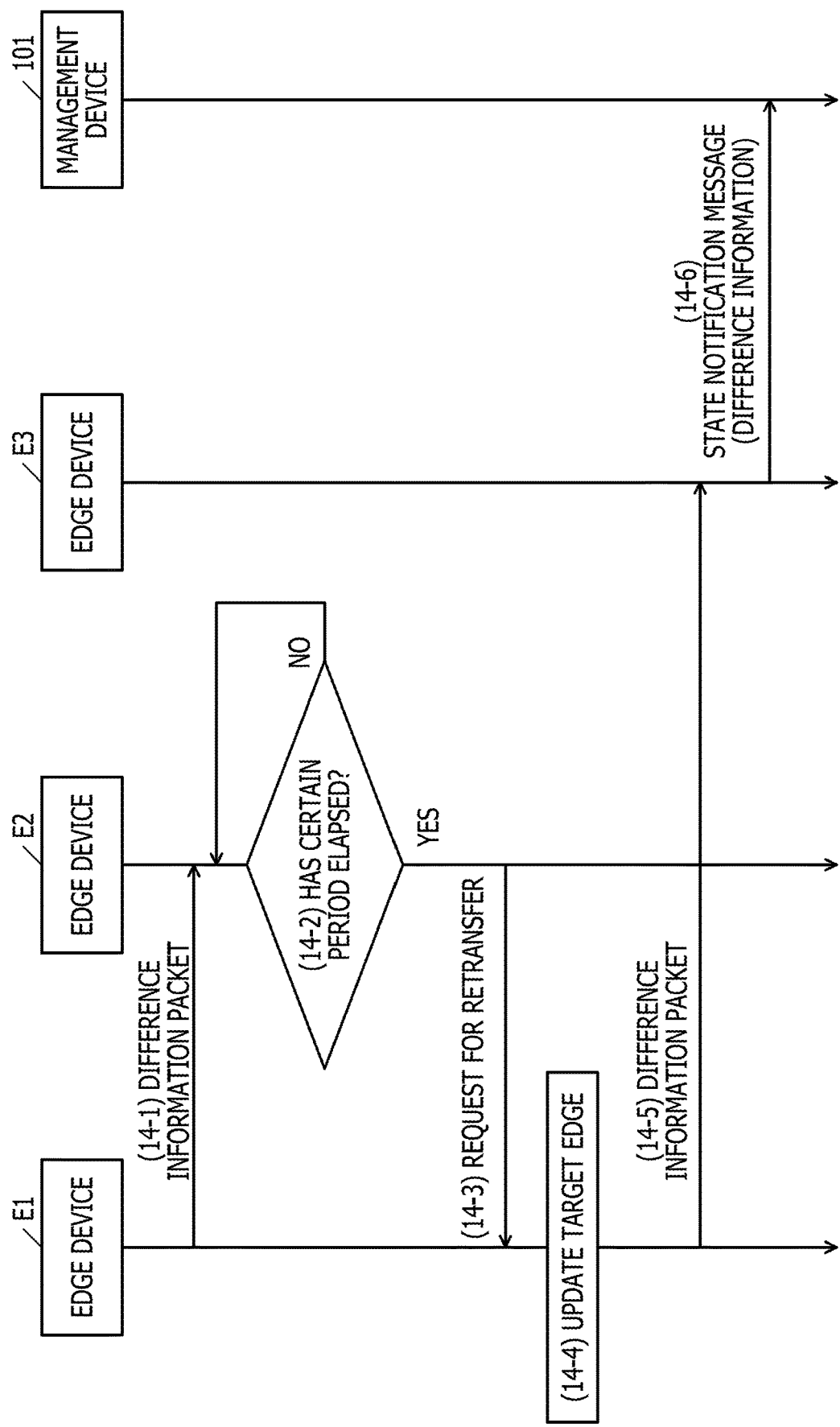
FIG. 14 is an explanatory diagram illustrating an operation example when the target edge is changed.

With reference to FIG. 14, an example of operation when changing the target edge will be described.

FIG. 14 is an explanatory diagram illustrating an operation example when the target edge is changed;

In FIG. 14, the edge device E1 is set as the edge device of the source of the difference information packet. The edge device E2 is set as the first ranked target edge having a higher transmission frequency of the state notification message to the management device 101 than the edge device E1. The edge device E3 is set as the second ranked target edge having a higher transmission frequency of the state notification message to the management device 101 than the edge device E1.

(14-1) The edge device E1 transmits the difference information packet to the edge device E2 which is the first ranked target edge.

(14-2) When the edge device E2 receives the difference information packet from the edge device E1, the edge device E2 determines whether the certain period t has elapsed since the difference information packet was received without transferring the difference information packet to the management device 101.

(14-3) In a case where the certain period t has elapsed since the difference information packet was received without transferring the difference information packet to the management device 101, the edge device E2 transmits, to the edge device E1, a request for retransfer of difference information. The edge device E2 may designate the target edge after change. For example, the edge device E2 refers to the target edge management table 110 to designate, as the target edge, an edge device having the highest rank other than the device itself.

(14-4) When the edge device E1 receives, from the edge device E2, the request for retransfer of difference information, the edge device E1 perform an update so that the second ranked edge device E3 is designated as the target edge. For example, the edge device E1 change the order of the first ranked target edge and the second ranked target edge in the target edge management table 110. The target edge after the change may be designated by the edge device E2, for example.

(14-5) The edge device E1 transmits the difference information packet to the edge device E3 which is the target edge after updating.

(14-6) Upon receiving the difference information packet from the edge device E1, the edge device E3 transmits the state notification message in which the difference information from the edge device E1 is included when transmitting the state notification message to the management device 101.

In this way, in a case where the state notification message to the management device 101 is not transmitted by the edge device E2 which is the target edge even after the certain period t has elapsed from the reception of the difference information packet from the edge device E1, the target edge may be changed. As a result, it is possible to avoid the delay of transfer of the difference information of the edge device E1 to the management device 101 and to suppress an error relating to the load state of the edge device E1.

Notification Processing Procedure of Edge Device Ei

Next, with reference to FIGS. 15 and 16, a notification processing procedure of the edge device Ei will be described.

Figure 15:
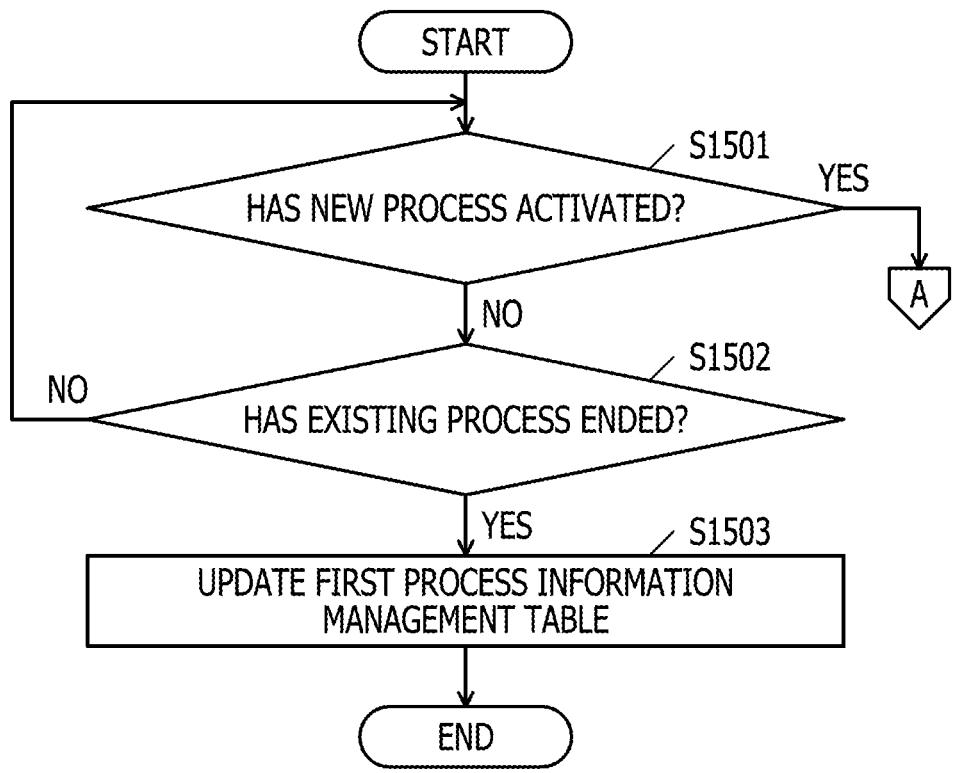
FIG. 15 is a flowchart (part 1) illustrating an example of a notification processing procedure of the edge device.
Figure 16:
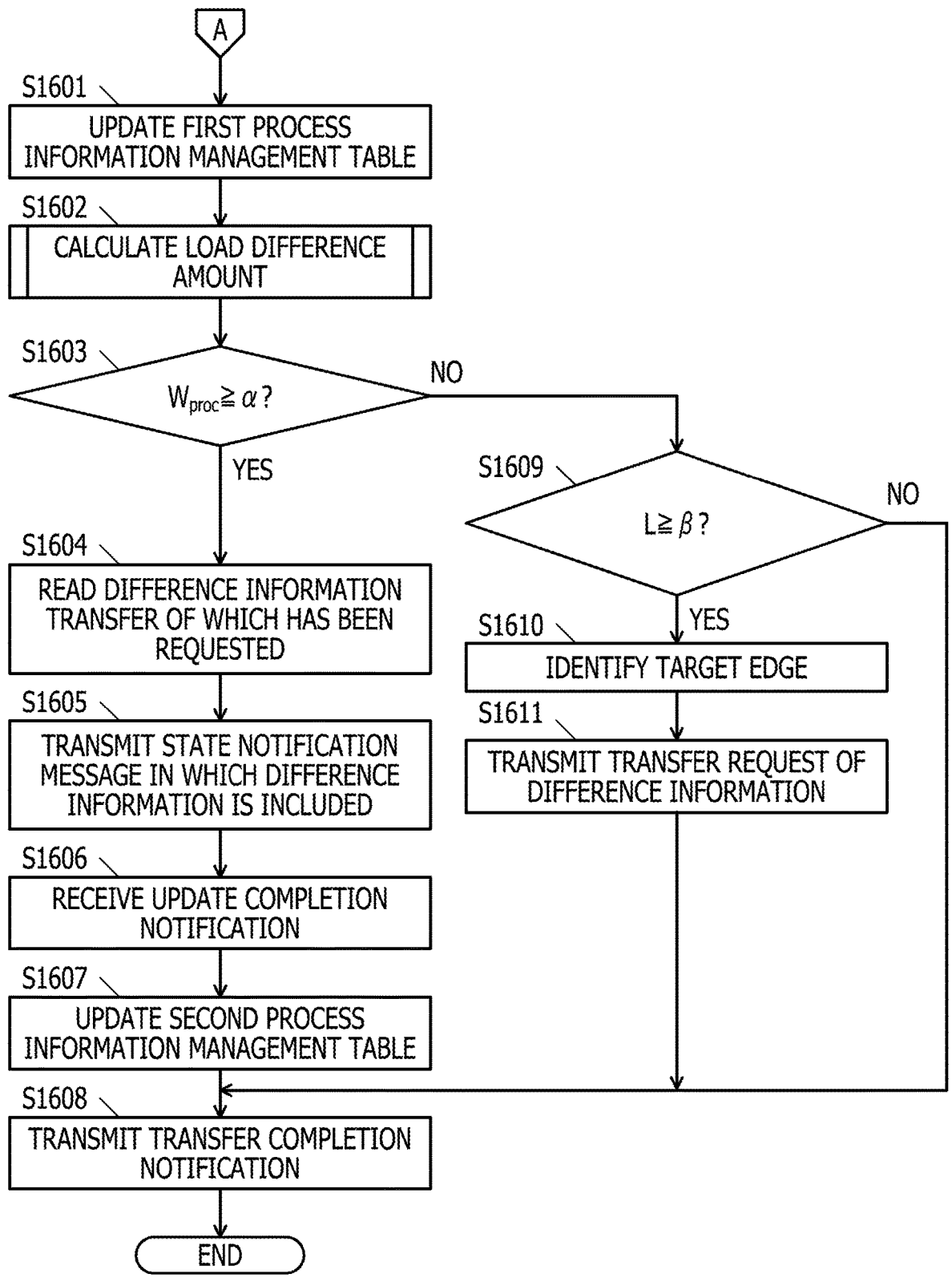
FIG. 16 is a flowchart (part 2) illustrating an example of the notification processing procedure of the edge device.

FIGS. 15 and 16 are flowcharts illustrating an example of the notification processing procedure of the edge device Ei. In the flowchart of FIG. 15, first, the edge device Ei determines whether a new process has been activated (step S1501). In a case where the new process is not activated (step S1501: "No"), the edge device Ei determines whether the existing process has ended (step S1502).

In a case where the existing process has not ended (step S1502: "No"), the edge device Ei returns to step S1501. On the other hand, if the existing process has ended (step S1502: "Yes"), the edge device Ei updates the first process information management table 130 (step S1503), and ends a series of processes according to this flowchart.

In step S1503, for example, the edge device Ei updates the first process information of each existing process in the first process information management table 130, and deletes the first process information of the existing process that has ended. On this occasion, the edge device Ei may update the load ($W_{proc}$) of the completed existing process in the load management table 120.

In step S1501, in a case where the new process is activated (step S1501: "Yes"), the process of the edge device Ei moves to step S1601 illustrated in FIG. 16.

In the flowchart of FIG. 16, first, the edge device Ei updates the first process information management table 130 (step S1601). For example, the edge device Ei registers the first process information of the new process in the first process information management table 130, and updates the first process information of the existing process in the first process information management table 130.

Next, the edge device Ei performs the load difference amount calculation process of calculating the load difference amount LD (step S1602). The specific processing procedure of the load difference amount calculation process will be described later with reference to FIG. 17. Next, the edge device Ei determines whether the load ($W_{proc}$) of the new process is equal to or greater than the threshold value α (step S1603).

In a case where the load ($W_{proc}$) of the new process is equal to or greater than the threshold value α (step S1603: "Yes"), the edge device Ei reads, from the transfer request difference information table 150, the difference information (transfer request difference information) the transfer of which has been requested (step S1604). The edge device Ei transmits, to the management device 101, the state notification message in which the read difference information is included (step S1605). The state notification message includes, for example, difference information indicating the load difference amount LD of the edge device Ei calculated in step S1602.

Next, when receiving the update completion notification from the management device 101 (step S1606), the edge device Ei updates the second process information management table 140 (step S1607). For example, the edge device Ei registers the second process information of the new process in the second process information management table 140, and updates the second process information of the existing process in the second process information management table 140.

The edge device Ei transmits a transfer completion notification to another edge device Ej that is the requesting source of the difference information the transfer of which has been requested (step S1608), and ends the series of processing according to this flowchart.

In step S1603, in a case where the load ($W_{proc}$) of the new process is less than the threshold value α (step S1603: "No"), the edge device Ei determines whether the calculated load difference amount LD is equal to or greater than the predetermined value β (step S1609). In a case where the load difference amount LD is less than the predetermined value β (step S1609: "No"), the edge device Ei ends a series of processes according to this flowchart.

On the other hand, in a case where the load difference amount LD is equal to or greater than the predetermined value β (step S1609: "Yes"), the edge device Ei refers to the target edge management table 110 to identify the target edge (step S1610). The edge device Ei transmits, the identified target edge, a request for transfer of the difference information indicating the calculated load difference amount LD to the management device 101 to (step S1611), and ends the series of processes according to this flowchart.

In this way, the difference information on the load state of the edge device Ei may be transferred from the target edge (another edge device Ej) having a higher transmission frequency of the state notification message to the management device 101 than the edge device Ei to the management device 101.

For example, when the edge device Ei receives the transfer completion notification from the target edge immediately after step S1611 or after step S1611, the edge device Ei updates the second process information management table 140. For example, the edge device Ei, based on the load difference amount LD, updates the end time of the existing process in the second process information management table 140.

Although illustration is omitted, the edge device Ei refers to the second process information management table 140 to monitor whether the expected process end time of any one of the entries has passed. In a case where the expected process end time of any one of the entries has passed, the edge device Ei deletes the entry from the second process information management table 140, and updates the expected process end time of the remaining entries in the second process information management table 140.

Next, with reference to FIG. 17, a specific processing procedure of the load difference amount calculation process in step S1602 illustrated in FIG. 16 will be described.

Figure 17:
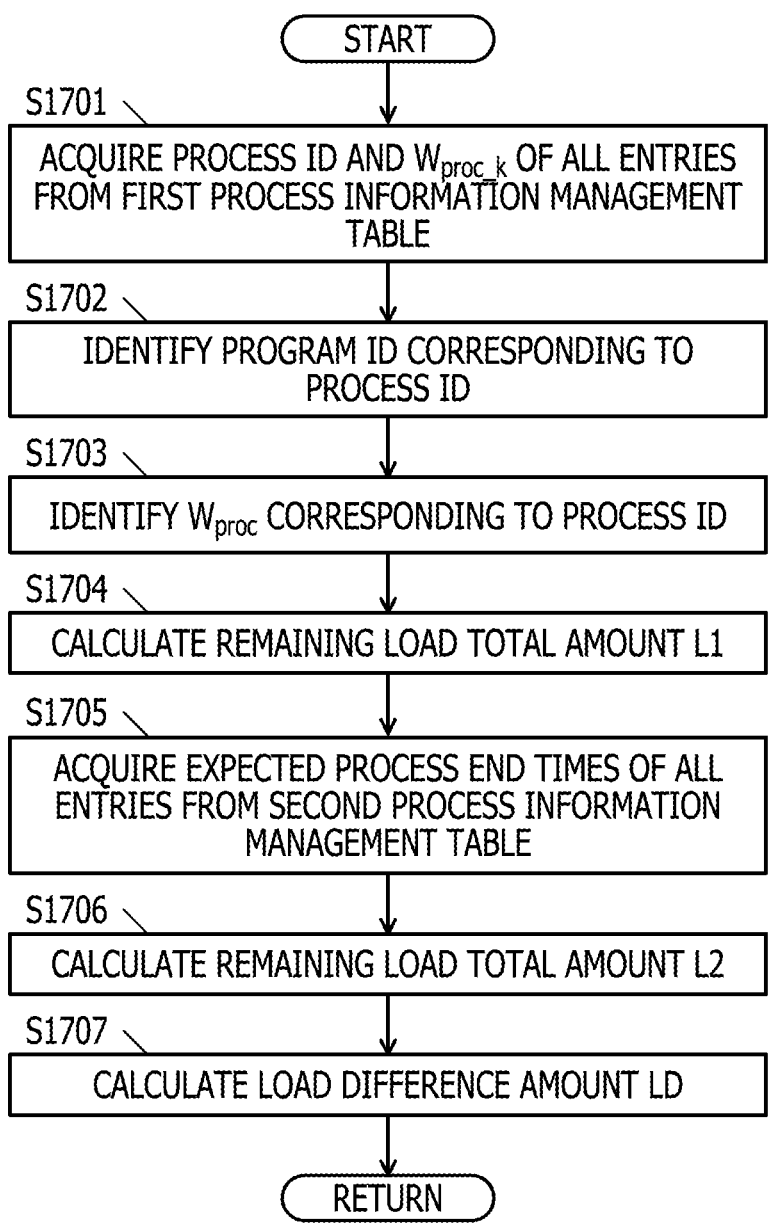
FIG. 17 is a flowchart illustrating an example of a specific processing procedure of a load difference amount calculation process.

FIG. 17 is a flowchart illustrating an example of a specific processing procedure of a load difference amount calculation process. In the flowchart of FIG. 17, first, the edge device Ei acquires, from the first process information management table 130, the processes ID and the loads ($W_{proc\_k}$) of all the entries (step S1701).

Next, the edge device Ei identifies the program ID corresponding to the acquired processes ID (step S1702). The edge device Ei refers to the load management table 120 to identify the load ($W_{proc}$) corresponding to the identified program ID (step S1703).

Next, the edge device Ei refers to the first process information management table 130 to calculate the remaining load total amount L1 of the edge device Ei by obtaining the sum of ($W_{proc}-W_{proc\_k}$) of all the entries using Expression (2) above (step S1704).

Next, the edge device Ei acquires, from the second process information management table 140, the expected process end time of all the entries (step S1705). The edge device Ei calculates the remaining load total amount L2 of the edge device Ei by obtaining the sum of (expected process end time−current time) of all the entries using the above Expression (3) (step S1706).

The edge device Ei calculates the load difference amount LD by subtracting the remaining load total amount L2 from the calculated remaining load total amount L1 (step S1707), and the process returns to the step which has called the load difference amount calculation process.

In this way, the edge device E1 may calculate the difference in load with the management device 101 where the difference is caused by not having made a notification of the activation of the process whose load ($W_{proc}$) is less than the threshold value α.

Error Processing Procedure of Management Device 101

Next, with reference to FIG. 18, an error processing procedure of the management device 101 will be described.

Figure 18:
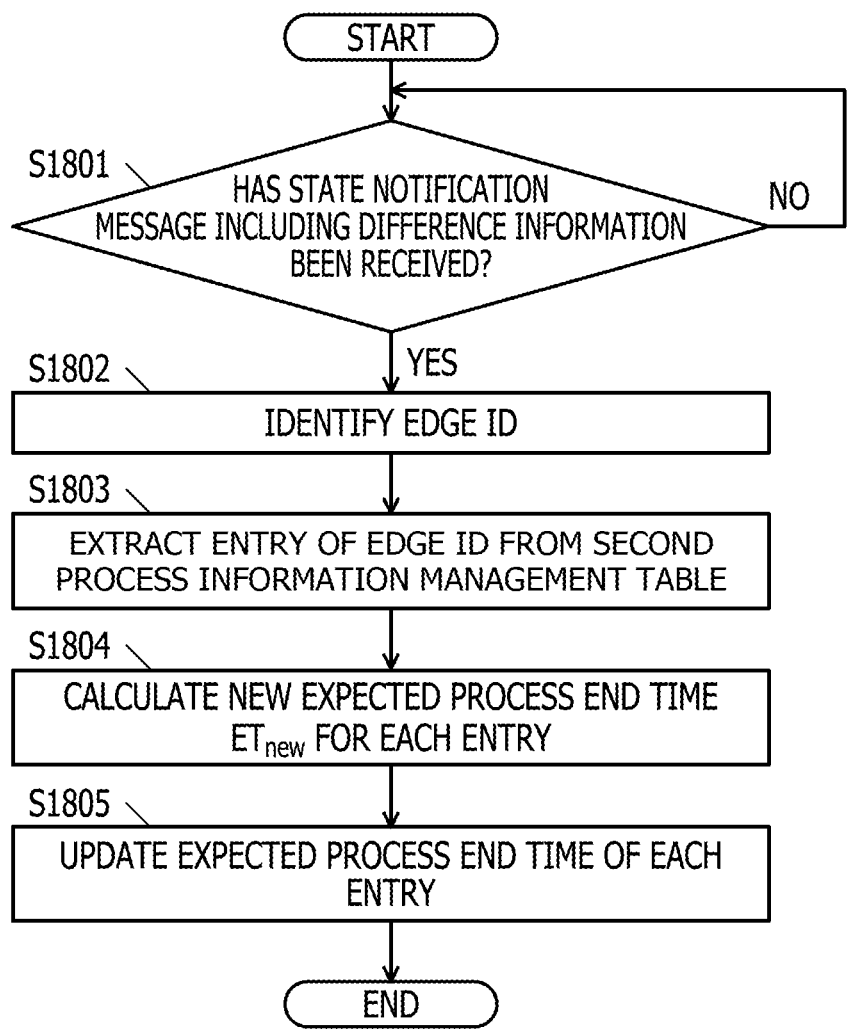
FIG. 18 is a flowchart illustrating an example of an error processing procedure of the management device.

FIG. 18 is a flowchart illustrating an example of the error processing procedure of the management device 101. In the flowchart of FIG. 18, first, the management device 101 determines whether a state notification message including difference information of the edge device Ei has been received from another edge device Ej (step S1801).

The management device 101 waits to receive the state notification message including the difference information (step S1801: "No"). In a case where the state notification message including the difference information is received (step S1801: "Yes"), the management device 101 identifies the edge ID of the edge device Ei included in the difference information (step S1802).

Next, the management device 101 extracts, from the second process information management table (for management) 160, the entry corresponding to the edge ID of the identified edge device Ei (step S1803). Next, using the above Expression (4), the management device 101 calculates a new expected process end time $ET_{new}$ of each extracted entry based on the load difference amount LD of the edge device Ei included in the difference information (step S1804).

The management device 101 updates, based on the calculated new expected process end time $ET_{new}$, the expected process end time of each entry in the second process information management table (for management) 160 (step S1805), and ends the series of processes according to this flowchart.

In this way, it is possible to correct an error relating to the load state caused by the fact that the edge device Ei has not notified the management device 101 of the activation of the process.

Although illustration is omitted, the management device 101 refers to the second process information management table (for management) 160 to monitor whether the expected process end time of any one of the entries has passed. In a case where the expected process end time of any one of the entries has passed, the management device 101 deletes the entry from the second process information management table (for management) 160, and updates the expected process end time of the remaining entries in the second process information management table (for management) 160.

As explained above, according to the distribution process system 100 of the embodiment, the edge device Ei may transmits a request for transfer of the difference information on the load state of the device itself to another edge device Ej which has a higher transmission frequency of the state notification message to the management device 101 than the device itself. In a case where another edge device Ej receives the transfer request of difference information from the edge device Ei, another edge device Ej may transmit the state notification message in which the difference information of the edge device Ei is included when transmitting the state notification message to the management device 101. In a case where the management device 101 receives from another edge device Ej the state notification message including difference information of the edge device Ei, the management device 101 may correct the load state of the edge device Ei based on the difference information.

In this way, the difference information on the load state of the edge device Ei may be transferred from another edge device Ej having a higher transmission frequency of the state notification message to the management device 101 than the edge device Ei to the management device 101. For this reason, it is possible to correct an error relating to the load state of the edge device Ei predicted by the cloud (management device 101) in the edge device Ei even if no process having load ($W_{proc}$) equal to or greater than the threshold value α occurs.

In a case where the edge device Ei receives the data transmitted from the device 102, the edge device Ei activates a process of corresponding to the contents of the received data, and when the load ($W_{proc}$) the activated process is equal to or greater than the threshold value α, transmits, to the management device 101, a state notification message including the load ($W_{proc}$) and the activation time of the activated process. For example, when the load ($W_{proc}$) the activated process is less than the threshold value α, the edge device Ei does not transmit the state notification message to the management device 101.

In this way, since the activation notification of the process where the load ($W_{proc}$) of the process activated by the edge device Ei is small is not transmitted, it is possible to reduce the number of messages transmitted and received between the edge device and the cloud.

In a case where the management device 101 receives the state notification message from the edge device Ei, based on the load ($W_{proc}$) of the process included in the received state notification message and the activation time, it is possible to predict the end time of the process.

In this way, since the process end time may be predicted from the load ($W_{proc}$) and the activation time of the process, it is possible to omit the end notification of the process activated by the edge device Ei and reduce the number of messages transmitted and received between the edge device and the cloud.

In a case where the load ($W_{proc}$) of the activated process is less than the threshold value α, the edge device Ei may determine whether the load difference amount LD is equal to or greater than the predetermined value β. In a case where the load difference amount LD is equal to or greater than the predetermined value β, the edge device Ei may transmit, to the target edge, a request for transfer of the difference information indicating the load difference amount LD to the management device 101.

In this way, in a case where the load difference amount LD is less than the predetermined value β, it is possible to avoid communication occurring frequently between edge devices by not requesting transfer of difference information.

As a result, according to the distribution process system 100, while suppressing the number of messages transmitted and received between the edge device and the cloud, it is possible to appropriately suppress an error relating to the load state of the edge device Ei predicted by the cloud (management device 101).

The error correction method described in this embodiment may be implemented by executing a prepared program by a computer such as a personal computer or a workstation. The error correction program may be stored in a computer readable recording medium such as a hard disk, a flexible disk, a compact disc (CD)-ROM, a magneto-optical disk (MO), a digital versatile disk (DVD), a universal serial bus (USB) flash memory, and is executed by being read out from the recording medium by the computer. This error correction program may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A distribution process system comprising:
    a first terminal including a first memory and a first processor configured to, in accordance with a change relating to a processing load of the first terminal, perform transmission of first information to a second terminal, the first information indicating the processing load of the first terminal, the second terminal being one of a plurality of nodes and being set a frequency of transmitting messages to a management device, the frequency of transmitting being higher than a transmission frequency set to the first terminal;
    the second terminal including a second memory and a second processor configured to, in response to receiving the first information, transmit a first message to the management device at a transmission timing based on the frequency of transmitting higher than the transmission frequency set to the first terminal, the first message including the received first information and second information indicating the processing load of the second terminal; and
    the management device including a third memory and a third processor configured to
    manage a load state of each of the first terminal and the second terminal, and
    in response to receiving of the first message from the second terminal, update the load state of the first terminal in accordance with the first information included in the received first message.

2. The distribution process system according to claim 1, wherein
    the change indicates a difference between an amount of the processing load of the first terminal detected by the first terminal and an amount of the processing load of the first terminal recognized by the management device.

3. The distribution process system according to claim 2, wherein
    the first information includes information representing the difference.

4. The distribution process system according to claim 1 wherein
    the first processor is configured to
    when receiving data transmitted from a device, activate a first process corresponding to contents of the data, and when a load of the first process is no less than a first threshold, transmit, to the management device, a second message relating to the processing load of the first terminal, the second message including the load of the first process and an activation time of the first process, and the third processor is configured to, when receiving the second message, predict an end time of the first process based on the load of the first process and the activation time of the first process each of which is included in the received second message.

5. The distribution process system according to claim 4, wherein the first processor is configured to, when the load of the first process is less than the first threshold, determine whether a calculated difference between an amount of the processing load of the first terminal detected by the first terminal and an amount of the processing load of the first terminal recognized by the management device is no less than a second threshold, and wherein the transmission of first information is performed when the calculated difference is no less than the second threshold.

6. The distribution process system according to claim 2, wherein the amount of the processing load of the first terminal detected by the first terminal is calculated in accordance with a remaining load required until one or more processes performed by the first terminal ends, and the amount of the processing load of the first terminal recognized by the management device is calculated in accordance with an end time of a first process predicted based on both a load of the first process and an activation time of the first process wherein the first process is a process whose load is no less than a threshold among one or more processes activated by the first terminal.

7. The distribution process system according to claim 1, wherein the third processor is configured to select the second terminal from among a plurality of terminals including the first terminal and the second terminal in accordance with a reception frequency of a message relating to the processing load of each of the first terminal and the second terminal, and transmit, to the first terminal, a notification to designate the second terminal selected as a transmission destination of the first information.

8. The distribution process system according to claim 1, wherein the first terminal and the second terminal are connected with each other via a local area communication network, and each of the first terminal and the second terminal is connected with the management terminal via a wide area communication network.

9. A distribution process method comprising:

transmitting, by a first terminal in accordance with a change relating to a processing load of the first terminal, first information to a second terminal, the first information indicating the processing load of the first terminal, the second terminal being one of a plurality of nodes and being set a frequency of transmitting messages to a management device, the frequency of transmitting being higher than a transmission frequency set to the first terminal;

transmitting, by the second terminal in response to receiving the first information, a first message to the management device at a transmission timing based on the frequency of transmitting higher than the transmission frequency set to the first terminal, the first message including the received first information and second information indicating the processing load of the second terminal; and updating, by the management device in response to receiving of the first message from the second terminal, a load state of the first terminal in accordance with the first information included in the received first message, wherein the management device configured to manage each load state of the first terminal and the second terminal.

10. The distribution process method according to claim 9, wherein the change indicates a difference between an amount of the processing load of the first terminal detected by the first terminal and an amount of the processing load of the first terminal recognized by the management device.

11. The distribution process system according to claim 10, wherein the first information includes information representing the difference.

12. The distribution process method according to claim 9, further comprising:

activating, by the first terminal in response to receiving data transmitted from a device, a first process corresponding to contents of the data;

transmitting, by the first terminal when a load of the first process is no less than a first threshold, a second message relating to the processing load of the first terminal to the management device, the second message including the load of the first process and an activation time of the first process; and predicting, by the management device in response to receiving the second message, an end time of the first process based on the load of the first process and the activation time of the first process each of which is included in the received second message.

13. The distribution process method according to claim 12, further comprising:

determining, by the first terminal when the load of the first process is less than the first threshold, whether a calculated difference between an amount of the processing load of the first terminal detected by the first terminal and an amount of the processing load of the first terminal recognized by the management device is no less than a second threshold, wherein the transmitting of first information is performed when the calculated difference is no less than the second threshold.

14. The distribution process method according to claim 10, wherein the amount of the processing load of the first terminal detected by the first terminal is calculated in accordance with a remaining load required until one or more processes performed by the first terminal ends, and the amount of the processing load of the first terminal recognized by the management device is calculated in accordance with an end time of a first process predicted based on both a load of the first process and an activation time of the first process wherein the first process is a process whose load is no less than a threshold among one or more processes activated by the first terminal.

15. The distribution process method according to claim 9, further comprising:
- selecting, by the management device, the second terminal from among a plurality of terminals including the first terminal and the second terminal in accordance with a reception frequency of a message relating to the processing load of each of the first terminal and the second terminal; and
- transmitting, by the management device, to the first terminal, a notification to designate the second terminal selected as a transmission destination of the first information.

16. The distribution process method according to claim 9, wherein
- the first terminal and the second terminal are connected with each other via a local area communication network, and
- each of the first terminal and the second terminal is connected with the management terminal via a wide area communication network.

\* \* \* \* \*